US008204465B2

United States Patent
Sakai et al.

(10) Patent No.: US 8,204,465 B2
(45) Date of Patent: Jun. 19, 2012

(54) RECEIVER, TRANSMITTER, TRANSMISSION SYSTEM, AND TRANSMISSION METHOD

(75) Inventors: Hideaki Sakai, Kyoto (JP); Kazunori Hayashi, Kyoto (JP); Yoji Okada, Osaka (JP); Tadashi Araki, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 802 days.

(21) Appl. No.: 12/298,710

(22) PCT Filed: Apr. 27, 2007

(86) PCT No.: PCT/JP2007/059232
§ 371 (c)(1), (2), (4) Date: Oct. 27, 2008

(87) PCT Pub. No.: WO2007/126073
PCT Pub. Date: Nov. 8, 2007

(65) Prior Publication Data
US 2009/0104876 A1 Apr. 23, 2009

(30) Foreign Application Priority Data
Apr. 27, 2006 (JP) .................. 2006-123743

(51) Int. Cl.
*H04B 1/10* (2006.01)
(52) U.S. Cl. ................................... 455/296
(58) Field of Classification Search ............... 455/63.1, 455/63.4, 296, 302, 304
See application file for complete search history.

(56) References Cited

U.S. PATENT DOCUMENTS

| 5,513,215 | A * | 4/1996 | Marchetto et al. | 375/233 |
| 6,650,617 | B1 * | 11/2003 | Belotserkovsky et al. | 370/210 |
| 6,996,194 | B2 * | 2/2006 | Pukkila et al. | 375/340 |
| 7,430,397 | B2 * | 9/2008 | Suda et al. | 455/7 |
| 7,593,494 | B1 * | 9/2009 | Ghobrial et al. | 375/350 |
| 2003/0109277 | A1 * | 6/2003 | Fulghum et al. | 455/552 |
| 2004/0120428 | A1 * | 6/2004 | Maltsev et al. | 375/341 |

(Continued)

FOREIGN PATENT DOCUMENTS

JP 10-294764 11/1998

(Continued)

OTHER PUBLICATIONS

Hayashi, K., "Fundamentals of Modulation/Demodulation and Equalization Technologies", 2004, pp. 523-532 and partial English translation thereof.

(Continued)

*Primary Examiner* — Thomas J Hiltunen
(74) *Attorney, Agent, or Firm* — McDermott Will & Emery LLP

(57) ABSTRACT

To reduce the affections of noises having greater instantaneous powers than received signals. A receiver of block transmission scheme, in which signal blocks from a transmitting end are received and equalization is performed for each of the received signal blocks, comprises a local noise detecting unit detecting a local noise locally existing in a received signal block and having a greater amplitude than the signals; a local noise eliminating unit generating a local-noise-eliminated received signal block in which the signals in the range where the local noise is existent within the received signal block have been eliminated together with the local noise; and an equalizer that performs an equalization based on the local-noise-eliminated received signal block.

15 Claims, 17 Drawing Sheets

U.S. PATENT DOCUMENTS

| | | | |
|---|---|---|---|
| 2004/0136453 A1* | 7/2004 | Lin et al. | 375/232 |
| 2004/0228397 A1* | 11/2004 | Bach | 375/232 |
| 2005/0041725 A1* | 2/2005 | De Rivaz et al. | 375/150 |
| 2005/0058232 A1 | 3/2005 | Murakami et al. | |
| 2006/0034362 A1* | 2/2006 | Kim et al. | 375/232 |
| 2006/0227904 A1* | 10/2006 | Mueller-Weinfurtner et al. | 375/343 |
| 2006/0239367 A1* | 10/2006 | Wilhelmsson et al. | 375/260 |
| 2007/0058701 A1* | 3/2007 | Wang et al. | 375/152 |
| 2007/0254590 A1* | 11/2007 | Lopez | 455/63.1 |
| 2007/0258352 A1* | 11/2007 | Wang et al. | 370/203 |
| 2009/0097581 A1* | 4/2009 | McCallister et al. | 375/260 |

FOREIGN PATENT DOCUMENTS

| | | |
|---|---|---|
| JP | 11-205166 | 7/1999 |
| JP | 2000-36764 | 2/2000 |
| JP | 2000-183766 | 6/2000 |
| JP | 2001-036422 | 2/2001 |
| JP | 2003-069435 | 3/2003 |
| JP | 2004-221973 | 8/2004 |
| JP | 2004-304455 | 10/2004 |
| JP | 2005-86779 | 3/2005 |
| JP | 2005-197813 | 7/2005 |
| JP | 2005-204037 | 7/2005 |
| JP | 2006-050016 | 2/2006 |
| WO | WO 2006/008793 | 1/2006 |

OTHER PUBLICATIONS

Yokoyama, M., "Spread Spectrum Communication System", 1988, pp. 393-425, Kagaku Gijutsu Shuppan, Inc., and partial English translation thereof.

Cioffi, J., et al., "A Data-Driven Multitone Echo Canceller", IEEE Transactions on Communications, Oct. 1994, pp. 2853-2869, vol. 42 No. 10.

Hayashi, K., "A New Spatio—Temporal Equalization Method Based on Estimated Channel Response", IEEE Transactions on Vehicular Technology, Sep. 2001, pp. 1250-1259, vol. 50 No. 5, IEEE.

Japanese Office Action, w/ English translation thereof, issued in Japanese Patent Application No. 2006-123743, dated Dec. 13, 2011.

* cited by examiner

FIG.5
(a)
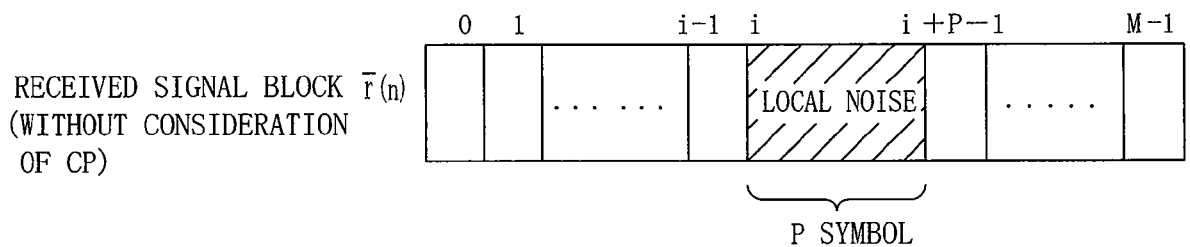
RECEIVED SIGNAL BLOCK $\bar{r}(n)$
(WITHOUT CONSIDERATION OF CP)
(b)
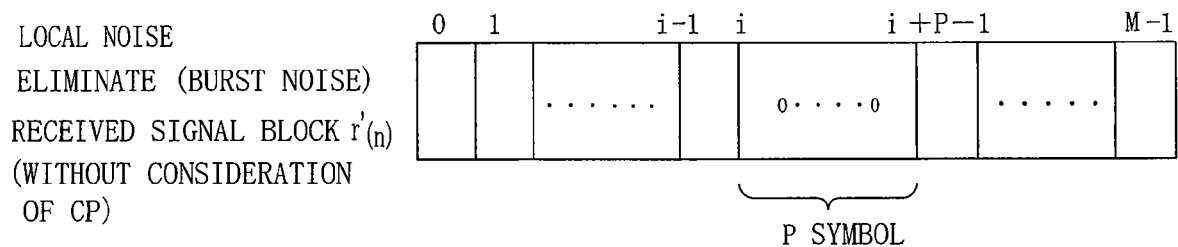
LOCAL NOISE
ELIMINATE (BURST NOISE)
RECEIVED SIGNAL BLOCK $r'(n)$
(WITHOUT CONSIDERATION OF CP)

FIG.9

(a) LOCAL NOISE ELIMINATED RECEIVED SIGNAL BLOCK $r'(n)$ ($L \leq i \leq M-L-P$)

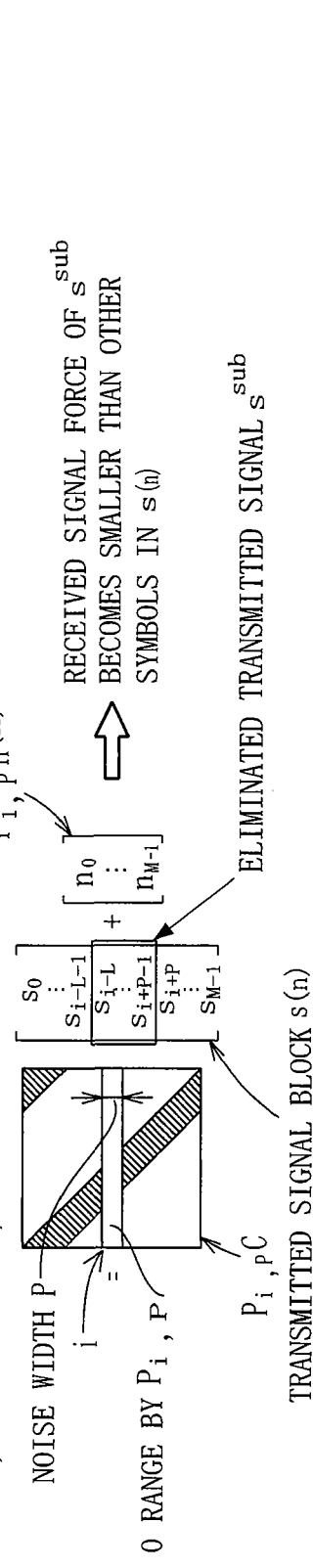

$r'(n) = P_{i,P} Cs(n) + P_{i,P} n(n)$    EXPRESSION(21)

RECEIVED SIGNAL FORCE OF $s^{sub}$ BECOMES SMALLER THAN OTHER SYMBOLS IN $s(n)$ (b) ELIMINATED SIGNAL REPLICA ($L \leq i \leq M-L-P$)

$C_{ISI} = C - P_{i,P} C$    EXPRESSION(26)

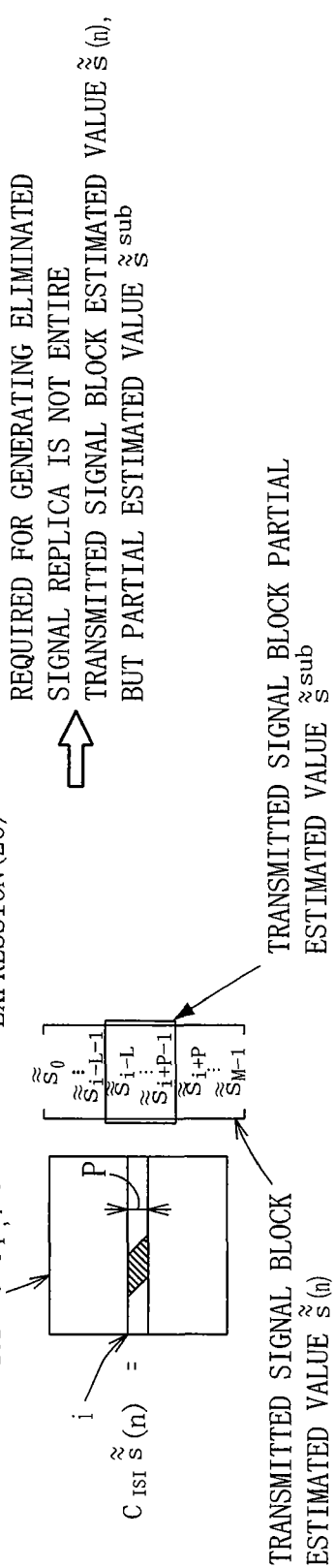

REQUIRED FOR GENERATING ELIMINATED SIGNAL REPLICA IS NOT ENTIRE TRANSMITTED SIGNAL BLOCK ESTIMATED VALUE $\tilde{\tilde{s}}^{sub}$ BUT PARTIAL ESTIMATED VALUE $\tilde{\tilde{s}}^{sub}$ (P=1)

(P=6)

RECEIVER, TRANSMITTER, TRANSMISSION SYSTEM, AND TRANSMISSION METHOD

RELATED APPLICATIONS

This application is the U.S. National Phase under 35 U.S.C. §371 of International Application No. PCT/JP2007/059232, filed on Apr. 27, 2007, which in turn claims the benefit of Japanese Application No. 2006-123743, filed on Apr. 27, 2006, the disclosures of which Applications are incorporated by reference herein.

TECHNICAL FIELD

The present invention relates to a receiver, a transmitter, a transmission system, and a transmission method based on a block transmission scheme, in which equalization processing is performed on a block to block basis. More specifically, the present invention relates to a technique for reducing an influence due to a noise which increases in amplitude instantaneously, such as a city noise, in a block transmission scheme.

BACKGROUND ART

In a block transmission scheme, signal blocks each including a plurality of symbols are transmitted to a receiving end, and then the receiving end performs processing such as equalization and demodulation on each signal block.

Examples of the block transmission scheme may include an OFDM (Orthogonal Frequency Division Multiplexing) scheme, an SC-CP (Single Carrier block transmission with Cyclic Prefix) scheme, where a cyclic prefix is applied to a single carrier modulation scheme, and the like.

The SC-CP scheme is similar to the OFDM scheme in a configuration that a transmission is performed with a guard interval having a cyclic prefix inserted thereinto and then the receiving end performs discrete frequency domain equalization.

Herein, the term "equalization" refers to processing of removing an influence due to a channel from a received signal. The SC-CP scheme adopts an equalizer in a discrete frequency domain. This equalizer realizes the equalization as follows. That is, the equalizer performs discrete Fourier transform on a vector of a received signal after removal of a cyclic prefix, multiplies each frequency component by a weight in a transform domain, and performs inverse discrete Fourier transform so as to convert the signal back into the signal in a time domain.

Such an equalizer is described in Kazunori Hayashi, "Fundamentals of Modulation/Demodulation and Equalization Technologies", Proc. MWE 2004, pp. 523-532, 2004, for example.

DISCLOSURE OF THE INVENTION

A conventional transmission scheme has been developed in consideration of countermeasures against a white Gaussian noise which is relatively smaller in amplitude than a received signal and is distributed to the entire signal in the time domain.

However, an impulsive noise (see FIG. 18), which is larger in instantaneous power than a received signal, such as a city noise, is different in behavior from the white Gaussian noise model. In many instances, consequently, the conventional transmission scheme fails to successfully perform demodulation due to the existence of the noise such as the city noise.

Moreover, the city noise locally exists in a block in the time domain, and is large in amplitude. As a result, an adverse influence is exerted on an entire frequency band in frequency domain equalization processing, resulting in failure of the equalization processing.

As described above, the noise which is larger in instantaneous power than the received signal, such as the impulsive city noise, becomes a significant factor of making it impossible to receive any signals or deteriorating a transmission error rate.

In the conventional block transmission scheme, however, there is no method for canceling a noise which is larger in instantaneous power than a received signal (hereinafter, also referred to "local noise").

In order to solve the problems described above, an object of the present invention is to provide a new technique for reducing an influence due to a noise which is larger in instantaneous power than a received signal.

The present invention provides a receiver for a block transmission scheme, in which signal blocks transmitted from a transmitting end are received and equalization processing is performed on each received signal block. The receiver includes: a local noise detecting unit detecting a local noise which locally exists in a received signal block and is larger in amplitude than a signal; a local noise eliminating unit generating a local noise eliminated received signal block from which a signal in a range where the local noise exists in the received signal block is eliminated together with the local noise; and an equalizer that performs equalization processing based on the local noise eliminated received signal block.

According to the present invention, the receiver eliminates the local noise existing in the received signal block. Then, the receiver performs the equalization processing based on the received signal block after elimination of the local noise. Accordingly, it is possible to reduce an adverse influence of a local noise to be exerted on a wide frequency range in equalization processing.

Preferably, the local noise detecting unit_detects, as the local noise, a range where a signal amplitude of the received signal block exceeds a predetermined threshold value.

Also preferably, the local noise detecting unit detects at least a position and a noise width of the local noise in the received signal block.

Preferably, when the local noise eliminated received signal block is defined as r', the equalizer performs the equalization processing based on the following expression:

$$\hat{s} = D^H \Gamma D r',$$

where D represents a discrete Fourier transform matrix and is given by the following expression:

$$D = \begin{bmatrix} 1 & 1 & \cdots & 1 \\ 1 & e^{-j\frac{2\pi \times 1 \times 1}{M}} & \cdots & e^{-j\frac{2\pi \times 1 \times (M-1)}{M}} \\ \vdots & \vdots & \ddots & \vdots \\ 1 & e^{-j\frac{2\pi \times (M-1) \times 1}{M}} & \cdots & e^{-j\frac{2\pi \times (M-1) \times (M-1)}{M}} \end{bmatrix}$$

$D^H D = I_M$ ($I_M$: identity matrix of $M \times M$), and $M$: block length $\Gamma$ represents a diagonal matrix having $\{\gamma_0, \ldots, \gamma M^{-1}\}$ as a diagonal component and is given by the following expression:

$$\gamma_m = \frac{\left(1 - \frac{P}{M}\right)\lambda_m^*}{\left(1 - \frac{P}{M}\right)^2 |\lambda_m|^2 + \frac{1}{M^2}\sum_{n=0, n\neq m}^{M-1} |\lambda_n|^2 \frac{1 - \cos\frac{2\pi}{M}(m-n)P}{1 - \cos\frac{2\pi}{M}(m-n)} + \left(1 - \frac{P}{M}\right)\frac{\sigma_s^2}{\sigma_n^2}}, m = 0, \cdots, M-1.$$

$\sigma_n^2$: variance of noise component of r'
$\sigma_s^2$: variance of signal component of r'
P: local noise width
$\lambda_m^*$: complex conjugate of $\lambda_m$
$\Lambda = \{\lambda_0, \ldots, \lambda_{M-1}\}$: discrete Fourier transform of channel impulse response $h = \{h_0, h_1, \ldots, h_L\}$ Preferably, the receiver further includes an eliminated signal replica generating unit generating, based on the local noise eliminated received signal block, an eliminated signal replica indicating a signal component eliminated together with the local noise upon generation of the local noise eliminated received signal block, and the equalizer performs the equalization processing on an eliminated signal added received signal block corresponding to the local noise eliminated received signal block to which the eliminated signal replica is added.

Herein, the receiver performs the equalization processing on the eliminated signal added received signal block obtained by adding to the local noise eliminated received signal block the eliminated signal replica indicating the signal component eliminated together with the local noise upon generation of the local noise eliminated received signal block. Thus, it is possible to reduce an adverse influence caused when local noise elimination processing is performed.

Preferably, the receiver further includes a transmitted signal block temporarily estimating unit temporarily estimating a transmitted signal block transmitted from a transmitting end, based on the local noise eliminated received signal block, and the eliminated signal replica generating unit generates the eliminated signal replica based on the temporarily estimated transmitted signal block.

Preferably, the eliminated signal replica generating unit generates the eliminated signal replica based on an eliminated transmitted signal defined by the following expression. In the case of calculating the eliminated signal replica, a signal to be required in actual is the eliminated transmitted signal defined by the following expression. Therefore, the calculation can be made efficient by use of this signal.

Eliminated transmitted signal $$s^{sub} = \begin{cases} [s_{i-L}, \cdots, s_{i+P-1}]^T, & L \leq i \leq M-P \\ [s_{M-L+i}, \cdots, s_{M-1}, s_0, \cdots, s_{i+P-1}]^T, & 0 \leq i \leq L-1 \end{cases}$$

where
transmitted signal block: $s(n) = [s_0, \ldots s_{M-1}]^T$
i: start position of local noise
P: local noise width
M: block length
L: order of channel Preferably, the eliminated signal replica generating unit calculates an eliminated received signal obtained by removing a component other than the eliminated transmitted signal in the temporarily estimated transmitted signal block, from the local noise eliminated received signal block, reconstructs the eliminated transmitted signal based on the eliminated received signal, and generates the eliminated signal replica based on the reconstructed eliminated transmitted signal.

The eliminated signal component included in the local noise eliminated received signal is small in power and is relatively unreliable. Therefore, the receiver calculates the eliminated received signal obtained by removing from the local noise eliminated received signal block the component (the relatively reliable component) other than the eliminated transmitted signal in the temporarily estimated transmitted signal block. Then, the receiver reconstructs the eliminated transmitted signal based on the eliminated received signal, leading to improvement in accuracy.

Preferably, when the eliminated signal added received signal block is defined as r'', the equalizer performs the equalization processing based on the following expression:

$$\hat{s} = D^H \Gamma D r'', \text{ and}$$

$$\gamma_m = \frac{\lambda_m^*}{|\lambda_m|^2 + \left(1 - \frac{P}{M}\right)\frac{\sigma_n^2}{\sigma_s^2}}, m = 0, \cdots, M-1$$

$\sigma_s^2$: variance of transmitted signal
$\sigma_n^2$: variance of thermal noise of receiver
P: local noise width
$\lambda_m^*$: complex conjugate of $\lambda_m$
$\Lambda = \{\lambda_0, \ldots, \lambda_{M-1}\}$: discrete Fourier transform of channel impulse response $h = \{h_0, h_1, \ldots, h_L\}$ Preferably, the receiver is configured so as to transmit to a transmitter information about a noise width of the local noise and/or an order of a transfer function of a signal channel. The transmitter can receive from the receiver the information about the noise width of the local noise and/or the order of the transfer function of the signal channel. Therefore, the transmitter can give an appropriate delay to the transmitted signal.

The present invention provides a transmitter for transmitting a signal block to a receiver, wherein the receiver removes a local noise from the received signal block to perform equalization processing. The transmitter includes a delay generating unit generating a delayed signal for a signal block to be transmitted such that an order of a transfer function of a signal channel recognized by the receiver becomes larger than an order of a transfer function of an actual channel.

When the transmitter generates the delayed signal for the signal block to be transmitted such that the order recognized by the receiver becomes larger than the order of the actual channel, the receiver can reconstruct a signal component eliminated in local noise elimination processing.

Preferably, the delay generating unit is configured to include multiple antennas that transmit transmitted signal blocks at different positions such that the order of the transfer function of the signal channel recognized by the receiver becomes large.

Moreover, the delay generating unit may be configured to combine a delayed transmitted signal block having a delay with the transmitted signal block and transmit the combined signal block such that the order of the transfer function of the signal channel recognized by the receiver becomes large.

Further preferably, when the delay generated by the delay generating unit is defined as D, the order of the transfer function of the actual channel is defined as L and a noise width of a local noise is defined as P, the delay D generated by the delay generating unit satisfies a relation of P≦D+L.

Also preferably, a transmitter capable of receiving from a receiver information about a noise width of a local noise contained in a received signal block and/or an order of a transfer function of a signal channel includes a delay generating unit generating a delayed signal for a signal block to be transmitted such that an order of a transfer function of a signal channel detected by the receiver becomes larger than an order of a transfer function of an actual channel. Herein, the delay generating unit generates a delayed signal indicating a delay amount corresponding to information about a local noise width and/or a transfer function order transmitted from the receiver.

A block transmission system according to the present invention is a block transmission system in which a receiving end receives signal blocks transmitted from a transmitting end to perform equalization processing on each received signal block. The block transmission system includes: a local noise detecting unit detecting a local noise which locally exists in a received signal block and is larger in amplitude than a signal; a local noise eliminating unit generating a local noise eliminated received signal block from which a signal in a range where the local noise exists in the received signal block is eliminated together with the local noise; and an equalizer that performs equalization processing based on the local noise eliminated received signal block.

A block transmission method according to the present invention is a block transmission method for equalizing a signal block transmitted from a transmitting end and received by a receiving end. The block transmission method includes the steps of: detecting a local noise which locally exists in a received signal block and is larger in amplitude than a signal; generating a local noise eliminated received signal block from which a signal in a range where the local noise exists in the received signal block is eliminated together with the local noise; and performing equalization processing based on the local noise eliminated received signal block.

BRIEF DESCRIPTION OF THE DRAWINGS

FIG. 5 shows a received signal block before and after elimination of a local noise.
FIG. 9 shows characteristics of a local noise eliminated received signal block and an eliminated signal replica.

BEST MODE FOR CARRYING OUT THE INVENTION

With reference to the drawings, hereinafter, description will be given of preferred embodiments of the present invention.

For facilitation of understanding, first, description will be given of a basic configuration of a transmission system in a SC-CP scheme which is one example of a block transmission scheme. Thereafter, description will be given of a transmission system in a SC-CP scheme to which the present invention is applied.

Basic Configuration of SC-CP Scheme Transmission System

Figure 1:
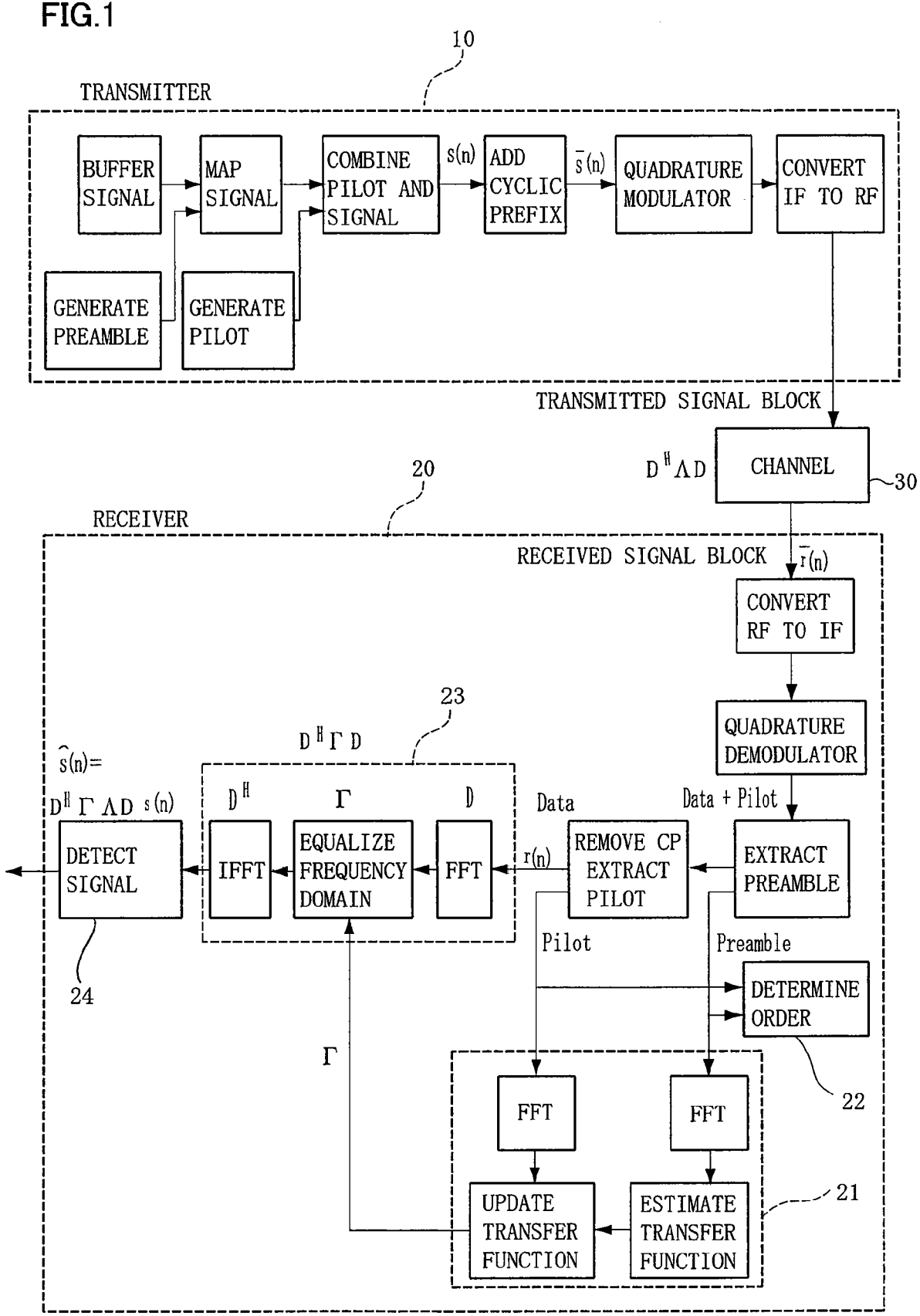
FIG. 1 shows a basic configuration of an SC-CP transmission system.

FIG. 1 shows the basic configuration of the SC-CP scheme transmission system. This transmission system includes a transmitter 10 and a receiver 20, and a signal transmitted from transmitter 10 is received by receiver 20 via a channel 30.

Figure 2:
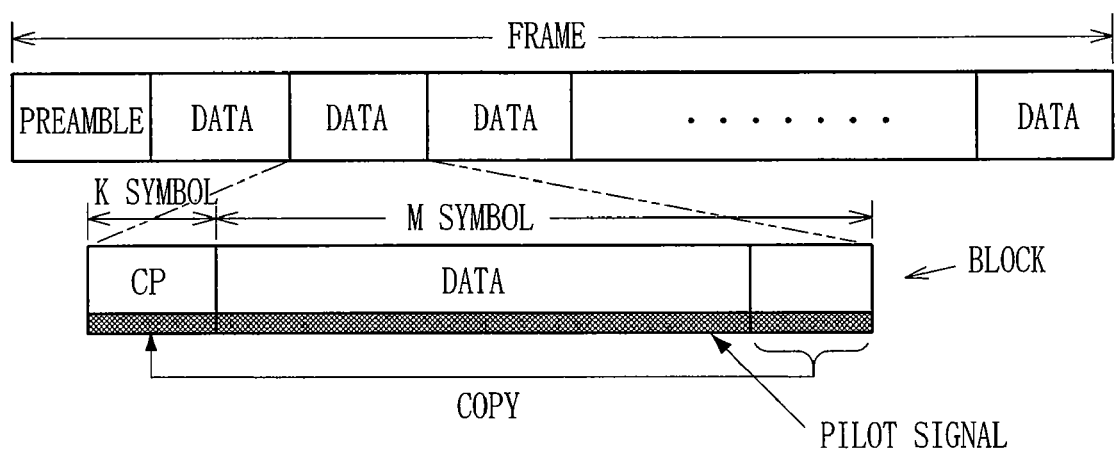
FIG. 2 shows a data structure in the SC-CP transmission scheme.

FIG. 2 shows a transmitted data format (a frame structure) in the transmission system described above. As shown in FIG. 2, a combination of a plurality of data blocks and a preamble block added thereto is called a frame. The data block (hereinafter, also referred to as simply "block") includes a block main body consisting of a plurality of complex base band signals (M symbols) and a cyclic prefix (K symbols) added thereto. It is to be noted that the cyclic prefix is also referred to as simply "CP" in the following description. Moreover, the term "symbol" typically refers to one symbol to which a plurality of bits are allocated. Alternatively, the symbol described herein may be one symbol to which only one bit is allocated.

The preamble block (hereinafter, also referred to as simply "preamble") refers to a known signal added to a leading end of the frame. The preamble is used for estimating a frequency transfer function in single carrier block transmission. In addition, the preamble is used for synchronization of a clock or a frequency in a receiver.

Examples of the preamble may include a PN (Pseudorandom Noise) signal sequence, a chirp signal, and the like. Herein, details of the PN signal are described in Mitsuo Yokoyama, "Spread Spectrum Communication System", Kagaku Gijutsu Shuppan, Inc., p. 393, 6.3 PN Sequence.

The chirp signal is "a sine wave of which a frequency increases linearly", and a method for generating the chirp signal is described in J. Cioffi and J. A. C. Bingham, "A Data-Driven Multitone Echo Canceller", IEEE Transactions on Communications, Vol. 42, No. 10, pp. 2853-2869, 1994B. The chirp signal has a merit capable of making both an amplitude in a time axis and an amplitude in a frequency axis constant.

Figure 3:
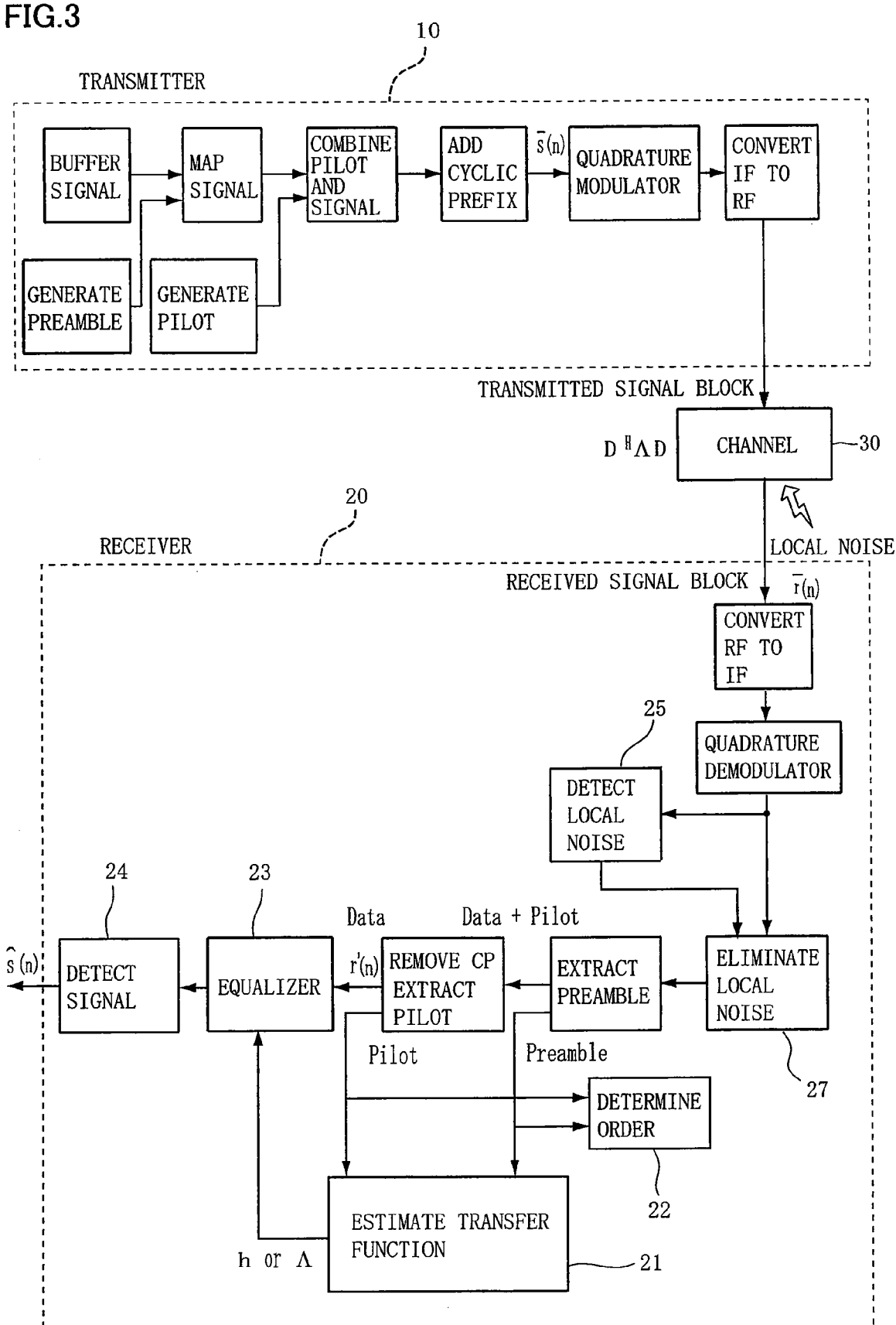
FIG. 3 shows a configuration of a transmission system according to the first embodiment.

The pilot signal is a known signal embedded into a data block. The pilot signal is used for estimating a frequency transfer function in a single carrier block transmission scheme. In addition, the pilot signal is used for synchronization of a clock or a frequency in a receiver. For example, an example of using a PN sequence suppressed in a data channel is shown in FIG. 3 in K. Hayashi and S. Hara, "A New Spatio-Temporal Equalization Method Based on Estimated Channel Response", IEEE Transactions on Vehicular Technology, Vol. 50, No. 5, pp. 1250-1259, 2001.

The CP corresponds to a copy of the last K (K<M) components in the block main body, and the copy is transferred to a leading end of the block main body without change of a sequence of the components. Addition of the CP to a transmitted signal block allows removal of inter-block interference and, also, allows improvement in performance in frequency domain equalization.

The inter-block interference (hereinafter, also referred to as simply "IBI") occurs when a delayed signal of a preceding block, which is generated on a signal channel, overlaps with a signal of a current block.

Addition of the CP allows removal of an influence due to the inter-block interference as long as the delayed signal of the preceding block stays in the CP of the current block. Details of this point are described in Kazunori Hayashi, "Fundamentals of Modulation/Demodulation and Equalization Technologies", Proc. MWE 2004, pp. 523-532, 2004.

Hereinafter, description will be given of major functions of transmitter 10 and major functions of receiver 20 through use of mathematical expressions. First, transmitter 10 generates a block of transmitted data including M symbols (block main body generation processing). Expression (1) represents a block main body s(n). In Expression (1), n represents a number given to each block. When n is defined as a number given to a current block, n−1 represents a number given to a preceding block.

$$s(n)=[s_0(n), s_1(n), \ldots, s_{M-1}(n)]^T \quad (1)$$

Next, transmitter 10 adds a CP to the block main body represented by Expression (1) to generate a CP added block. Expression (2) represents CP addition processing. Transmitter 10 modulates and transmits the CP added block.

$$\bar{s}(n)=T_{CP}s(n) \quad (2)$$

In Expression (2), $T_{CP}$ represents an operation of transferring a copy of the last K components in block main body s(n) to a leading end of block main body s(n) without change of a sequence of the components. Specifically, Expression (3) represents such an operation.

$$T_{CP} = \begin{bmatrix} 0_{K \times (M-K)} & I_K \\ I_M & \end{bmatrix} \text{ Matrix size: } (M+K) \times M \quad (3)$$

The signal block transmitted from transmitter 10 is received and demodulated by receiver 20 while suffering from an influence due to signal channel 30.

Receiver 20 includes a transfer function estimating unit 21 for channel 30, and transfer function estimating unit 21 estimates a transfer function (an impulse response) h={$h_0$, $h_1$, ..., $h_L$} of channel 30, based on a preamble and a pilot signal. The estimation of the transfer function is performed based on a result of Fast Fourier Transform (FFT) performed on the preamble and the pilot signal. The estimated transfer function is given to an equalizer 23 for performing equalization processing on a received signal block.

It is to be noted that the estimation of the transfer function can be performed by using only a preamble in a leading end of a frame. Alternatively, a transfer function estimated by a pilot signal combined with a block is updated (corrected), so that the transfer function of the channel, which varies every moment, can be estimated more accurately.

Receiver 20 also includes an order determining unit 22 for channel 30, and order determining unit 22 determines an order L of channel 30. The determination of order L may be performed by Fast Fourier Transform (FFT) as in transfer function estimating unit 21. Alternatively, the determination may be performed by an order determination algorithm such as AIC (AKAIKE Information Criterion) or MDL (Minimum Description Length).

In the case of performing the determination of the order by Fourier transform, the order may be determined from a maximum delay of a signal in which a thermal noise portion is removed by a predetermined threshold value, based on a result of the Fourier transform. Order L determined as described above is used for various calculations in receiver 20.

As described above, when the impulse response of the channel (the communication channel) is defined as h={$h_0$, $h_1$, ..., $h_L$}, the received signal block in receiver 20 is represented by Expression (4).

$$\bar{r}(n) = [\bar{r}_0(n), \cdots, \bar{r}_{M+K-1}(n)]^T \quad (4)$$

$$= H \begin{bmatrix} \bar{s}(n-1) \\ \bar{s}(n) \end{bmatrix}$$

Herein, H can be represented by Expression (5).

$$H = \begin{bmatrix} 0 & \cdots & h_L & \cdots & h_0 & 0 & \cdots & 0 \\ \vdots & & \ddots & \ddots & & \ddots & \ddots & \vdots \\ \vdots & & & \ddots & \ddots & & \ddots & 0 \\ 0 & \cdots & \cdots & \cdots & 0 & h_L & \cdots & h_0 \end{bmatrix} \quad (5)$$

Matrix size: $(M+K) \times 2(M+K)$

Further, when H is divided into two submatrixes $H_1$ (Expression (6)) and $H_0$ (Expression (7)) of (M+K)×(M+K), the received signal block is represented by Expression (8).

$$H_1 = \begin{bmatrix} 0 & \cdots & h_L & \cdots & h_1 \\ \vdots & & \ddots & \ddots & \vdots \\ \vdots & & & \ddots & h_L \\ \vdots & & & & \vdots \\ 0 & \cdots & \cdots & \cdots & 0 \end{bmatrix} \quad (6)$$

$$H_0 = \begin{bmatrix} h_0 & & & \\ \vdots & h_0 & 0 & \\ h_L & & \ddots & \\ & \ddots & & \ddots \\ 0 & & h_L & \cdots & h_0 \end{bmatrix} \quad (7)$$

$$\bar{r}(n) = H_1\bar{s}(n-1) + H_0\bar{s}(n) + \bar{n}(n) \quad (8)$$
$$= H_1 T_{CP} s(n-1) + H_0 T_{CP} s(n) + \bar{n}(n)$$

Matrix size: $(M+K) \times 1$

In Expression (8), the first term in a right side is a signal component from a (n−1)th transmitted signal block (a preceding block), and represents an inter-block interference (IBI) component.

Receiver 20 performs processing of removing the CP from the received block. Such processing is represented by Expression (9).

$$r(n) = R_{CP}\bar{r}(n)$$
$$= R_{CP}H_1 T_{CP}s(n-1) + R_{CP}H_0 T_{CP}s(n) + R_{CP}\bar{n}(n)$$

Matrix size: $M \times 1$ (9)

In Expression (9), $R_{CP}$ represents an operation of removing the CP, and the CP removing operation is represented by Expression (10).

$$R_{CP} = [0_{M \times K} I_M] \quad \text{Matrix size: } M \times (M+K) \quad (10)$$

With regard to a CP length K and order L of the channel (physically corresponding to an impulse response length L of the channel), herein, if a relation of $K \geq L$ is established, that is, if CP length K is not less than order L of the channel, then, a relation of $R_{CP}H_1 = 0$ is established irrespective of a transmitted signal block.

Therefore, a received signal r(n) after removal of the CP is represented by the following expression.

$$r(n) = R_{CP}H_0\bar{s}(n) + R_{CP}\bar{n}(n) \quad (11)$$
$$= R_{CP}H_0 T_{CP}s(n) + R_{CP}\bar{n}(n)$$

Thus, the inter-block interference component is removed.

Herein, the following expression represents a development of $R_{CP}H_0 T_{CP}$ in Expression (11).

$$R_{CP}H_0 T_{CP} = \begin{bmatrix} h_0 & 0 & \cdots & 0 & h_L & \cdots & h_1 \\ \vdots & h_0 & \ddots & & & \ddots & \vdots \\ h_L & & \ddots & \ddots & & & h_L \\ 0 & \ddots & & \ddots & \ddots & & 0 \\ \vdots & \ddots & & & \ddots & \ddots & \vdots \\ \vdots & & \ddots & \ddots & & \ddots & 0 \\ 0 & \cdots & \cdots & 0 & h_L & \cdots & h_0 \end{bmatrix} = C \quad (12)$$

The matrix having the structure in Expression (12) is called a circulant matrix, and has a characteristic of "allowing unitarily similarity transform by a DFT (Discrete Fourier Transform) matrix".

The matrix is represented by the following expression through use of the characteristic of the circulant matrix.

$$C = D^H \Lambda D \quad (13)$$
where $$\Lambda = \begin{bmatrix} \lambda_0 \\ \vdots \\ \lambda_{M-1} \end{bmatrix} = D \begin{bmatrix} h_0 \\ \vdots \\ h_L \\ 0_{[(M-L-1) \times 1]} \end{bmatrix} \quad (14)$$

$$D = \begin{bmatrix} 1 & 1 & \cdots & 1 \\ 1 & e^{-j\frac{2\pi \times 1 \times 1}{M}} & \cdots & e^{-j\frac{2\pi \times 1 \times (M-1)}{M}} \\ \vdots & \vdots & \ddots & \vdots \\ 1 & e^{-j\frac{2\pi \times (M-1) \times 1}{M}} & \cdots & e^{-j\frac{2\pi \times (M-1) \times (M-1)}{M}} \end{bmatrix} \quad (15)$$

$D^H D = I_M$   $I_M$: identity matrix of $M \times M$

When a noise component in the second term of a right side in Expression (11) is defined as n(n), received signal r(n) after removal of the CP is represented by the following expression.

$$r(n) = D^H \Lambda D s(n) + n(n) \quad (16)$$

Equalizer 23 performs frequency domain equalization processing in the following manner. That is, equalizer 23 performs discrete Fourier Transform on the received signal block after removal of the CP, multiplies each frequency component by a weight in a transform domain and performs inverse discrete Fourier transform so as to convert the signal block back into the signal in a time domain, thereby realizing the equalization. Consequently, if there exists a burst-like local noise that exerts an adverse influence on a wide frequency band, the adverse influence is exerted on the wide frequency band in the frequency domain equalization processing.

Herein, when a weight in the discrete frequency domain is defined as $\{\gamma_0, \ldots, \gamma_{M-1}\}$ and a diagonal matrix having such a weight as a diagonal component is defined as $\Gamma$, then, a signal as an output from the equalizer is represented by the following expression.

$$\hat{s}(n) = (D^H \Gamma D) D^H \Lambda D s(n) \quad (17)$$
$$= D^H \Gamma \Lambda D s(n)$$

Further, an equalizer weight based on a ZF (Zero Forcing) criterion and an equalizer weight based on an MMSE (Minimum Mean Square Error) criterion are described in Kazunori Hayashi, "Fundamentals of Modulation/Demodulation and Equalization Technologies", Proc. MWE 2004, pp. 523-532, 2004.

ZF Equalizer Weight $$\gamma_i = \frac{1}{\lambda_i}, i = 0, \cdots, M-1 \quad (18)$$

MMSE Equalizer Weight $$\gamma_i = \frac{\lambda_m^*}{|\lambda_i|^2 + \sigma_n^2/\sigma_s^2}, i = 0, \cdots, M-1 \quad (19)$$

$\sigma_s^2$: variance of signal s(n)
$\sigma_n^2$: variance of noise n(n)
$\lambda_i^*$: complex conjugate of $\lambda_i$ Herein, $\Lambda = \{\lambda_0, \ldots, \lambda_{M-1}\}$ represents discrete Fourier transform of the impulse response of the channel from Expression (14). Simulation examples of these weights are also described in Kazunori Hayashi, "Fundamentals of Modulation/Demodulation and Equalization Technologies", Proc. MWE 2004, pp. 523-532, 2004. In the single carrier block transmission scheme, the MMSE-criterion equalizer is superior in characteristic to the ZF-criterion equalizer.

A main factor that the ZF-criterion equalizer is inferior to the MMSE-criterion equalizer is noise enhancement. The noise enhancement is a phenomenon that "in a case where a response $\lambda_i$ of a communication channel in a certain frequency takes a value of 0 or a value close to 0, a weight in the frequency disadvantageously takes a considerably large value, resulting in amplification of a noise."

When equalizer 23 performs the equalization processing, receiver 20 can reproduce the transmitted signal block with reduced influence due to the channel. Subsequently, a signal detecting unit 24 can detect a symbol. Signals indicating a single symbol are different in phase and amplitude from each other due to an influence of a noise, and the like; therefore, signal detecting unit 24 detects the symbol based on a predetermined criterion (a threshold value).

[First Embodiment]

FIG. 3 shows a block transmission system according to the first embodiment of the present invention. It is to be noted that points which are not particularly described in the first embodiment are similar to those in the transmission system shown in FIG. 1.

Figure 4:
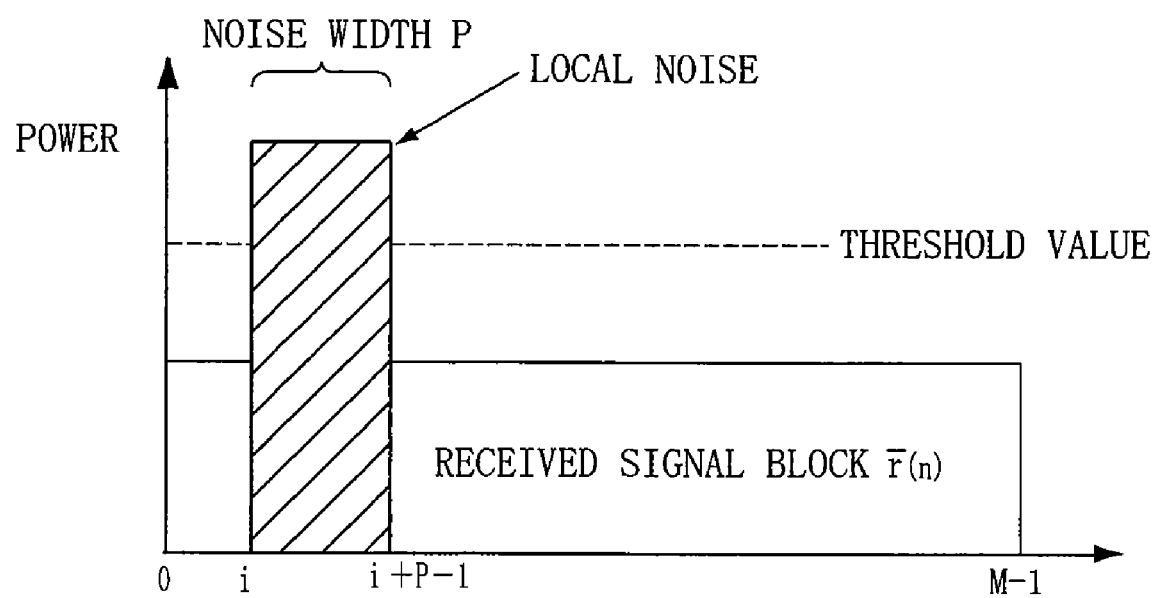
FIG. 4 shows a local noise detection principle.

As shown in FIG. 4, a channel 30 that suffers from an influence of a city noise contains a local noise (hereinafter, also referred to as "burst noise") which locally exists in a received signal block and is larger in amplitude than a signal, in some instances.

As shown in FIG. 3, a receiver 20 includes a local noise detecting unit 25 that detects the local noise contained in the received signal block. Local noise detecting unit 25 detects, as the local noise (the burst noise), a signal which is larger in signal amplitude than a predetermined threshold value.

Receiver 20 also includes a local noise eliminating unit 27 that generates a local noise eliminated received signal block corresponding to the received signal block from which a signal in a range where the local noise exists is eliminated together with the local noise. It is to be noted in the following description that the local noise appears on only one portion in the received signal block for simplification of the description. In actual, however, the local noise may exists in a plurality of portions in the received signal block.

As shown in FIG. 4, the threshold value for detecting the local noise is set at a value having a signal amplitude larger than a normal signal amplitude of the received signal block. More specifically, the signal amplitude of the threshold value is preferably larger than the normal signal amplitude of the received signal block by not less than 20 dB to 30 dB.

Local noise detecting unit 25 detects a position and a noise width of the local noise in the received signal block. In this embodiment, the position of the local noise is detected as a noise start position i while the noise width is detected as a width (a temporal width) P in which the noise exists from noise start position i.

It is to be noted that a method for specifying the range where the local noise exists is not limited to position i and width P. For example, the range of the local noise may be specified by a start position and an end position of the local noise. In the following, description will be given of processing performed in a case where the range of the local noise is specified by position i and width P.

FIG. 5(a) shows a block before elimination of a local noise by local noise eliminating unit 27, and FIG. 5(b) shows the block after elimination of the local noise by local noise eliminating unit 27. As shown in FIGS. 5(a) and 5(b), local noise eliminating unit 27 sets all signals at a time in which a detected local noise exists at 0. That is, symbols (P symbols counted from position i) in a range where the local noise exists are set at 0 in the received signal block.

The local noise elimination processing eliminates an inherent received signal component (a data signal) in the range where the local noise exists, but allows removal of the local noise exerting an adverse influence on the wide frequency range in equalization processing.

A received signal block subjected to local noise elimination processing (a local noise eliminated received signal block) r' is represented by the following expression. In FIG. 3, the block before removal of the CP is subjected to the detection of the local noise and the elimination of the local noise. In the following, description will be given of a case where the block after removal of the CP (a block length=M) is subjected to the elimination of the local noise, for facilitation of understanding.

In Expression (8) representing the received signal without consideration of the local noise, such local noise is taken into consideration. Thus, Expression (8) is changed to Expression (20). That is, the received signal block before being subjected to the local noise elimination processing is represented by Expression (20).

$$\bar{r}(n) = H_1 \bar{s}(n-1) + H_0 \bar{s}(n) + \bar{n}(n) + \bar{v}(n) \qquad (20)$$
$$= H_1 T_{CP} s(n-1) + H_0 T_{CP} s(n) + \bar{n}(n) + \bar{v}(n)$$

where
$\bar{v}(n)$: local noise

In Expression (20), it is assumed that the local noise is a burst-like noise having a large amplitude throughout consecutive P complex base band signal intervals.

Then, local noise eliminated received signal block r' subjected to the removal of the CP and the local noise elimination processing is equivalent to CP removed received signal r(n) represented by Expression (9) and Expression (16) and subjected to the local noise elimination processing and, therefore, is represented by Expression (21).

$$r'(n) = P_{i,P} r(n) \qquad (21)$$
$$= P_{i,P} C s(n) + P_{i,P} n(n)$$

Herein, $P_{i,P}$ is represented by the following expression.

$$P_{i,P} = \text{diag}[\underbrace{1 \cdots 1}_{i-1} \ 0_{1 \times P} \ \underbrace{1 \cdots 1}_{M-(i-1)-P}] \quad \text{Matrix size: } M \times M \qquad (22)$$

From among M signals after removal of the CP, P signals (symbols) counted from an i-th signal are substituted with 0 by the local noise elimination processing (see FIGS. 5(a) and 5(b)). Herein, diag in Expression (22) represents a diagonal matrix.

Even when the local noise eliminated received signal block obtained as described above is subjected to the equalization processing in the frequency domain by equalizer 23, the local noise which exerts an adverse influence on the wide frequency range is eliminated; therefore, an error rate can be made favorable.

Moreover, a propagation delay occurs at normal channel 30. By existence of such a propagation delayed signal, the inherent data signal eliminated by the local noise (the eliminated signal) is reconstructed naturally. In a transmission environment in which an appropriate delayed signal exists, the eliminated signal can be reconstructed in receiver 20, so that accurate transmission can be realized. It is to be noted that detailed description of this point will be given later.

Figure 6:
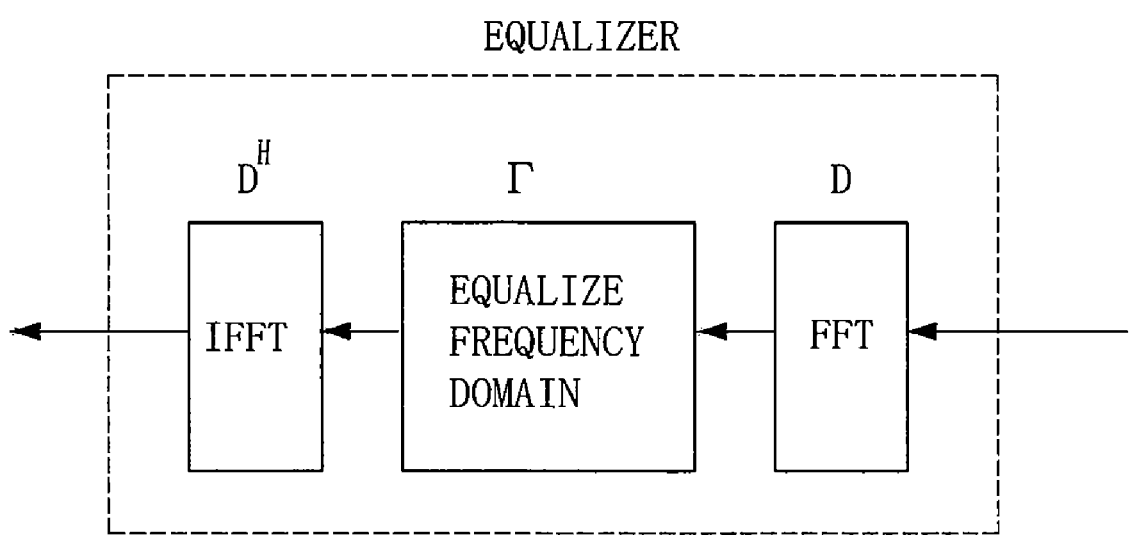
FIG. 6 shows a block diagram of an equalizer.

Preferably, equalizer 23 has a structure shown in FIG. 6 and performs processing represented by Expression (23).

$$\hat{s}_{fde}(n) = D^H \Gamma D r'(n) \qquad (23)$$

In Expression (23), D represents the DFT matrix represented by Expression (15). In a case where the weight of equalizer 23 in the discrete frequency domain is defined as $\{\gamma_0, \ldots, \gamma_{M-1}\}$, Γ represents a diagonal matrix having this weight as a diagonal component. Then, the weight $\{\gamma_0, \ldots, \gamma_{M-1}\}$ of equalizer 23 may be represented by Expression (18) or Expression (19). More desirably, the weight $\{\gamma_0, \ldots, \gamma_{M-1}\}$ is represented by Expression (24).

$$\gamma_m = \frac{\left(1 - \frac{P}{M}\right)\lambda_m^*}{\left(1 - \frac{P}{M}\right)^2 |\lambda_m|^2 + \frac{1}{M^2}\sum_{n=0,n\neq m}^{M-1} |\lambda_n|^2 \frac{1 - \cos\frac{2\pi}{M}(m-n)P}{1 - \cos\frac{2\pi}{M}(m-n)} + \left(1 - \frac{P}{M}\right)\frac{\sigma_s^2}{\sigma_n^2}} \quad m = 0, \ldots, M-1 \quad (24)$$

$\sigma_n^2$: variance of noise component $P_{i,p}n(n)$ of received signal $r'(n)$ $\sigma_s^2$: variance of signal component $P_{i,p}Cs(n)$ of received signal $r'(n)$ $\lambda_m^*$: complex conjugate of $\lambda_m$ Expression (24) represents an MMSE equalizer weight for the local noise eliminated received signal block, on which an influence due to elimination of the local noise is reflected, in the MMSE equalizer weight represented by Expression (19).

Since the equalizer weight represented by Expression (24) is suitable for the local noise eliminated received signal block in comparison with the conventional MMSE equalizer weight represented by Expression (19), Equalizer 23 having the equalizer weight represented by Expression (24) is improved in characteristic in comparison with the equalizer having the conventional MMSE equalizer weight.

[Second Embodiment]

Figure 7:
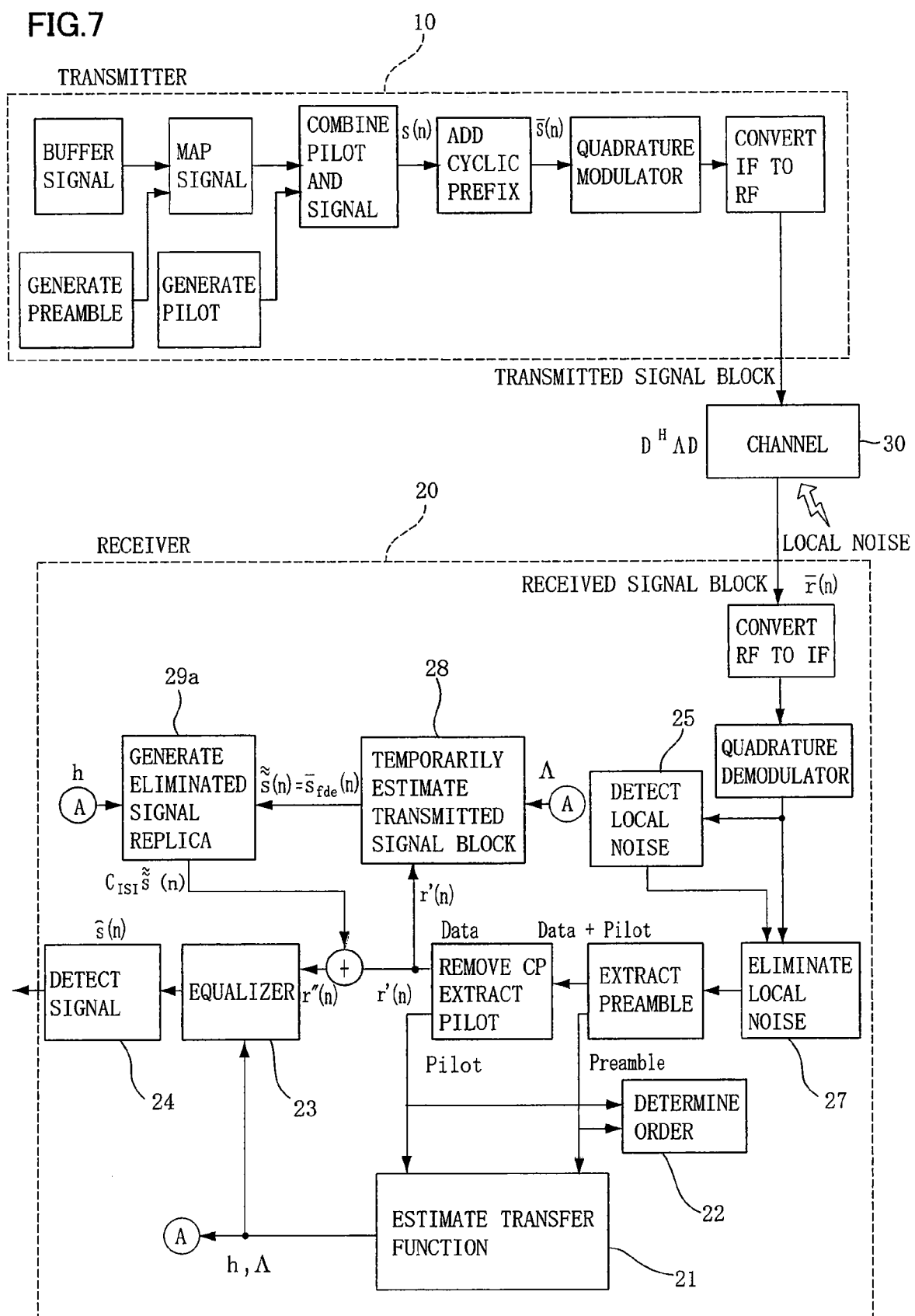
FIG. 7 shows a configuration of a transmission system according to the second embodiment.

FIG. 7 shows a transmission system according to the second embodiment. It is to be noted that points which are not particularly described in the second embodiment are similar to those of the transmission system shown in FIG. 1 and those of the transmission system according to the first embodiment.

Like receiver 20 according to the first embodiment, a receiver 20 according to the second embodiment performs equalization processing based on a local noise eliminated received signal block. In the first embodiment, receiver 20 directly performs the equalization processing on the local noise eliminated received signal block. In the second embodiment, on the other hand, receiver 20 performs additional processing on the local noise eliminated received signal block and, then, performs the equalization processing on the local noise eliminated received signal block.

Specifically, receiver 20 according to the second embodiment includes a transmitted signal block temporarily estimating unit 28 and an eliminated signal replica generating unit 29a. Then, transmitted signal block temporarily estimating unit 28 and eliminated signal replica generating unit 29a generate a replica of a signal component (an eliminated signal) eliminated from a received signal in local noise elimination processing. Then, receiver 20 according to the second embodiment adds this eliminated signal replica to the local noise eliminated received signal block represented by Expression (21) to generate an eliminated signal added received signal block.

In comparison with the local noise eliminated received signal block, the eliminated signal added received signal block can be subjected to the equalization processing favorably because the replica of the eliminated signal is added thereto. Moreover, the eliminated signal added received signal block can be subjected to the equalization processing through use of the conventional equalizer weight which is represented by Expression (18) or Expression (19) in place of the equalizer weight which requires the complex calculation represented by Expression (24), leading to simplification (acceleration) of calculation.

Hereinafter, more detailed description will be given of processing to be performed by transmitted signal block temporarily estimating unit 28 and processing to be performed by eliminated signal replica generating unit 29a, based on mathematical expressions.

First, the local noise eliminated received signal block is represented by Expression (25). It is to be noted that the first line in Expression (25) is equal to the second line in Expression (21).

$$r'(n) = P_{i,p}Cs(n) + P_{i,p}n(n) \quad (25)$$
$$= Cs(n) - C_{ISI}s(n) + P_{i,p}n(n)$$

where $C_{ISI}$ is defined as $$C_{ISI} = C - P_{i,p}C \quad (26)$$

Herein, C represents the circulant matrix represented by Expression (12).

It is apparent from the comparison with Expression (16) that the local noise eliminated received signal block represented by Expression (25), to which $C_{ISI}s(n)$ is added, theoretically becomes equal to the received signal block represented by Expression (16), which suffers from no influence of the local noise. That is, it can be considered that $C_{ISI}s(n)$ corresponds to the eliminated signal eliminated together with the local noise in the local noise elimination processing.

Eliminated signal replica generating unit 29a estimates the replica of the eliminated signal. Then, receiver 20 adds the eliminated signal replica to local noise eliminated received signal block $r'(n)$ represented by Expression (25) to generate an eliminated signal added received signal block $r''(n)$.

That is, eliminated signal added received signal block $r''(n)$ is represented as the first line in Expression (27). The eliminated signal added received signal block becomes almost equal to the received signal block (the second line in Expression (27)) suffering from no influence of the local noise (see also Expression (16) and Expression (13)).

$$r''(n) = r'(n) + C_{ISI}\tilde{s}(n) \quad (27)$$
$$\approx Cs(n) + n(n)$$

$\tilde{s}(n)$: estimated value of transmitted signal block $s(n)$

The eliminated signal added received signal block becomes almost equal to the received signal block suffering from no influence of the local noise; therefore, the equalization processing can be performed by equalizer 23 having the conventional equalizer weight represented by Expression (18) or Expression (19).

Eliminated signal replica generating unit 29a can generate the eliminated signal replica through use of $C_{ISI}$ represented by Expression (26) and the estimated value of transmitted signal block $s(n)$. Herein, $C_{ISI}$ can be calculated from Expression (26), based on a transfer function estimated by a transfer function estimating unit 21. Moreover, the estimated value of transmitted signal block $s(n)$ is calculated by a transmitted signal block temporarily estimating unit 28.

Transmitted signal block temporarily estimating unit 28 calculates the estimated value of transmitted signal block s(n) from Expression (28).

Estimated value of transmitted signal block $$\tilde{\tilde{s}}(n) = \tilde{s}_{fde}(n) = \begin{bmatrix} \tilde{s}_0^{fde} \\ \vdots \\ \tilde{s}_{M-1}^{fde} \end{bmatrix} \quad (28)$$

$$= \langle \hat{s}_{fde}(n) \rangle = \langle D^H \Gamma D r'(n) \rangle$$

The estimated transmitted signal block calculated from Expression (23) (the local noise eliminated received signal block subjected to the equalization processing through use of the weight represented by Expression (24)) is subjected to signal detection processing to obtain the estimated value of transmitted signal block s(n) represented by Expression (28). That is, transmitted signal block temporarily estimating unit 28 in the second embodiment is equal in function to equalizer 23 and signal detecting unit 24 in receiver 20 shown in FIG. 3 (the first embodiment).

It is to be noted that the equalizer weight for obtaining the estimated value of transmitted signal block s(n) is not limited to that represented by Expression (24). For example, any other weights may be used as the equalizer weight.

As described above, receiver 20 according to the second embodiment uses, as the transmitted signal block estimated value for generating the eliminated signal replica, the transmitted signal block estimated by the functions (equalizer 23 and detecting unit 24 shown in FIG. 3) of receiver 20 according to the first embodiment.

[Third Embodiment]

Figure 8:
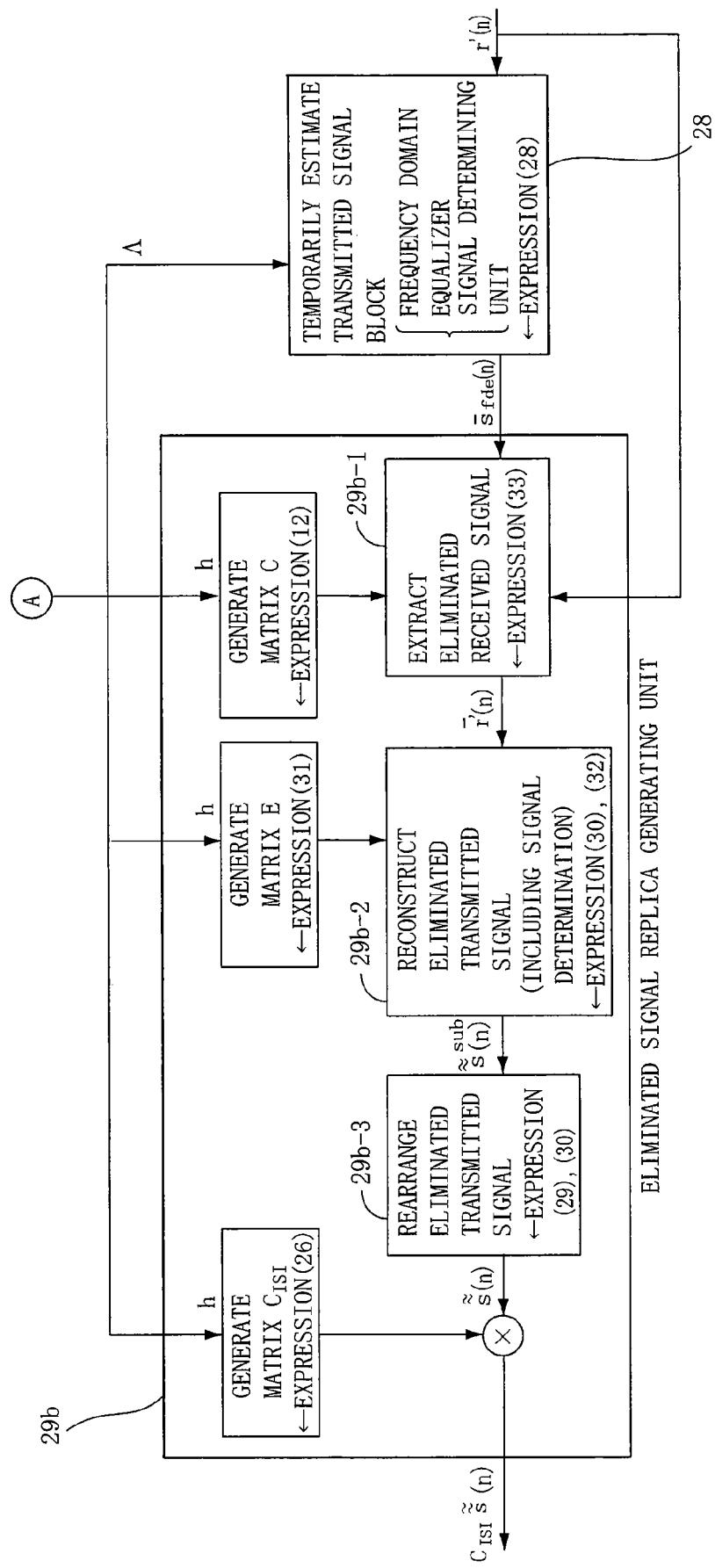
FIG. 8 shows a block diagram of an eliminated signal replica generating unit according to the third embodiment.

FIG. 8 shows a transmitted signal block temporarily estimating unit 28 and an eliminated signal replica generating unit 29b in a receiver 20 of a transmission system according to the third embodiment. It is to be noted that points which are not particularly described in the third embodiment are similar to those in the transmission systems shown in FIGS. 1 and 7 as well as those in the transmission systems according to the first and second embodiments.

Receiver 20 according to the third embodiment has eliminated signal replica generating unit 29b which is an improvement of eliminated signal replica generating unit 29a in the second embodiment. Constituent elements other than eliminated signal replica generating unit 29a are similar to those in the second embodiment shown in FIG. 7. Accordingly, description will be given of the third embodiment with reference to FIG. 7 if necessary.

Prior to description about a characteristic of eliminated signal replica generating unit 29b in the third embodiment, description will be given of a characteristic of the local noise eliminated received signal block represented by Expression (21) and a characteristic of the eliminated signal replica represented by Expression (26).

[Characteristic of Local Noise Eliminated Received Signal Block Represented by Expression (21)]

FIG. 9(*a*) shows Expression (21). As shown in FIG. 9(*a*), a portion showing a matrix $P_{i,P}C$ includes a hatched portion showing a range of a matrix component where h exists and a white portion showing a range where the matrix component is 0, in circulant matrix C defined by Expression (12). The portion showing matrix $P_{i,P}C$ also includes a horizontal band-shaped white portion showing a 0 range by $P_{i,P}$.

It is apparent from FIG. 9(*a*) that most of power in a portion caused by $s^{sub}$ are lost and decreased from among total power of local noise eliminated received signal block r'(n). In the following description, $s^{sub}$ is referred to as an eliminated transmitted signal. Accordingly, sufficient accuracy can not be ensured even when the estimated value of transmitted signal block s(n) is directly calculated from local noise eliminated received signal block r'(n) and, then, eliminated transmitted signal $s^{sub}$ is extracted from the estimated value, as represented by Expression (28).

[Characteristic of Eliminated Signal Replica Represented by Expression (26)]

FIG. 9(*b*) shows Expression (26). As shown in FIG. 9(*b*), a portion showing a matrix $C_{ISI}$ is obtained by subtracting matrix $P_{i,P}$ shown in FIG. 9(*a*) from circulant matrix C defined by Expression (12), and includes a hatched portion where h exists.

It is apparent from FIG. 9(*b*) that the estimated value of the entire transmitted signal block is not used, but the estimated value (the reconstructed value) of the value (the eliminated transmitted signal) near the symbol eliminated in the local noise elimination processing is satisfactorily used in order to generate the eliminated signal replica. Use of this value allows acceleration of the calculation. It is to be noted that the number of symbols of the eliminated transmitted signal is obtained by adding an order L of a transfer function to a local noise length P.

Expression (29) and Expression (30) are an arithmetic expression for generating the eliminated signal replica through use of the characteristic of the eliminated signal replica shown in FIG. 9(*b*). In order to obtain the eliminated signal replica, Expression (29) uses the reconstructed value (Expression (30)) of the eliminated transmitted signal corresponding to the partial estimated value of the transmitted signal block.

It is to be noted that forms of Expressions (29) to (33) are different from one another in terms of a position i of a local noise in some instances; therefore, such expressions are represented separately in accordance with position i. However, basic concepts of Expressions (29) to (33) are the same irrespective of position i.

Eliminated signal replica $$C_{ISI}\tilde{\tilde{s}}(n) = \begin{cases} C_{ISI} \begin{bmatrix} 0_{(i-L)\times 1} \\ \tilde{\tilde{s}}_{i-L} \\ \vdots \\ \tilde{\tilde{s}}_{i+P-1} \\ 0_{(M-i-P)\times 1} \end{bmatrix}, & L \leq i \leq M - P \\ C_{ISI} \begin{bmatrix} \tilde{\tilde{s}}_0 \\ \vdots \\ \tilde{\tilde{s}}_{i+P-1} \\ 0_{(M-P-L)\times 1} \\ \tilde{\tilde{s}}_{M-L+i} \\ \vdots \\ \tilde{\tilde{s}}_{M-1} \end{bmatrix}, & 0 \leq i \leq L - 1 \end{cases} \quad (29)$$

The eliminated transmitted signal is calculated from Expressions (30a) and (30b).

Eliminated transmitted signal reconstructed value $$\tilde{s}^{sub}(n) = \langle (E^H E)^{-1} E^H \vec{r}'^{sub}(n) \rangle \quad (30a)$$

$$= \begin{cases} [\tilde{s}_{i-L}, \ldots, \tilde{s}_{i+P-1}]^T, & L \leq i \leq M-P \\ [\tilde{s}_{M-L+i}, \ldots, \tilde{s}_{M-1}, \tilde{s}_0, \ldots, \tilde{s}_{i+P-1}]^T, & 0 \leq i \leq L-1 \end{cases} \quad (30b)$$

where, in Expression (30a), $$E = \begin{bmatrix} h_0 & & 0 \\ \vdots & \ddots & \\ h_{L-1} & \cdots & h_0 \\ & h_L & \cdots & h_1 \\ & & \ddots & \\ 0 & & & h_L \end{bmatrix} \text{Matrix size: } 2L \times (L+P) \quad (31)$$

Submatrix of eliminated received signal $$\vec{r}'^{sub}(n) = \begin{cases} [\vec{r}'_{i-L}, \ldots, \vec{r}'_{i-1}, \vec{r}'_{i+P}, \ldots, \vec{r}'_{i+P+L-1}]^T, & L \leq i \leq M-L-P \\ [\vec{r}'_{M-L+i}, \ldots, \vec{r}'_{M-1}, \vec{r}'_0, \ldots, \vec{r}'_{i-1}, \vec{r}'_{i+P}, \ldots, \vec{r}'_{i+P+L-1}]^T, & 0 \leq i \leq L-1 \\ [\vec{r}'_{i-L}, \ldots, \vec{r}'_{i-1}, \vec{r}'_{i+P}, \ldots, \vec{r}'_{M-1}, \vec{r}'_0, \ldots, \vec{r}'_{i+P+L-M-1}]^T, & M-L-P+1 \leq i \leq M-P \end{cases} \quad (32)$$

Eliminated received signal $$\vec{r}'(n) = \begin{bmatrix} \vec{r}'_0 \\ \vdots \\ \vec{r}'_{M-1} \end{bmatrix} \quad (33)$$

$$= \begin{cases} r'(n) - C \left( \bar{s}_{fde} - \begin{bmatrix} 0_{(i-L) \times 1} \\ \bar{s}^{fde}_{i-L} \\ \vdots \\ \bar{s}^{fde}_{i+P-1} \\ 0_{(M-i-P) \times 1} \end{bmatrix} \right), & L \leq i \leq M-P \\[2em] \underbrace{r'(n)}_{\text{Local noise eliminated received signal block}} - C \left( \bar{s}_{fde} - \begin{bmatrix} \bar{s}^{fde}_0 \\ \vdots \\ \bar{s}^{fde}_{i+P-1} \\ 0_{(M-P-L) \times 1} \\ \bar{s}^{fde}_{M-L-1} \\ \vdots \\ \bar{s}^{fde}_{M-1} \end{bmatrix} \right), & 0 \leq i \leq L-1 \end{cases}$$

(Component other than eliminated transmitted signal in temporarily estimated transmitted signal block)

Hereinafter, description will be given of Expressions (30) to (33).

Figure 10:
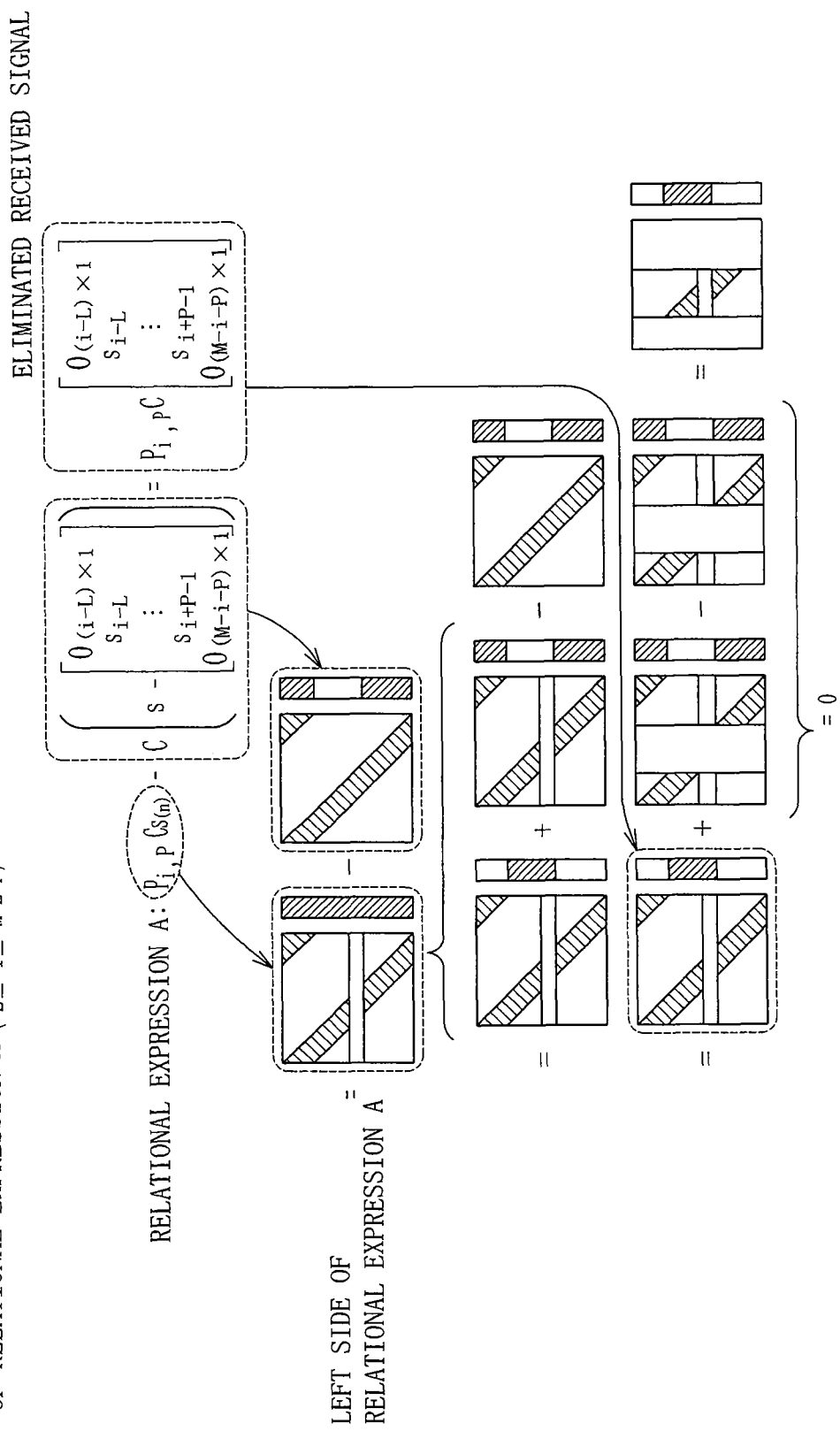
FIG. 10 shows proof of Relational Expression A.

First, description will be given of Relational Expression A which becomes a premise of the description. In FIG. 10, the first term of a left side in Relational Expression A represents a theoretical value (thermal noise: 0) of the local noise eliminated received signal block. Moreover, the second term of the left side in Relational Expression A represents an addition of an influence C to a component other than an eliminated transmitted signal $s^{sub}$ (see FIG. 9(a)) of transmitted signals s in accordance with a transfer function of a channel 30. Further, a signal defined at a right side in Relational Expression A is called "an eliminated received signal". The eliminated received signal corresponds to a theoretical value (thermal noise: 0) of a signal in a case where receiver 20 receives the eliminated transmitted signal.

That is, Relational Expression A indicates that the eliminated received signal is obtained by subtracting the addition of influence C due to the signal channel to the component other than eliminated transmitted signal $s^{sub}$ of transmitted signals s from the local noise eliminated received signal block.

From Relational Expression A, the eliminated received signal can be obtained by calculation of the left side in Relational Expression A. The left side of Relational Expression A contains the transmitted signal transmitted from transmitter 10. In order to perform calculation of the left side in Relational Expression A, preferably, receiver 20 uses the transmitted signal block estimated value (Expression (28)) which is temporarily estimated by transmitted signal block temporarily estimating unit 28 of receiver 20.

Moreover, $P_{i,P}Cs(n)$ in the first term of the left side of Relational Expression A is almost equal to actually received local noise eliminated received signal block (containing the thermal noise) r'(n).

That is, the left side of Relational Expression A is represented as Modified Expression B shown in FIG. 1, and becomes almost equal to the eliminated received signal (a right side of Relational Expression A).

Expression (33) described above represents a summary of the foregoing description. As described above, the eliminated received signal can be extracted by the calculation of Expression (33). It is to be noted that the calculation of Expression (33) is performed by an eliminated received signal extracting unit 29b-1 in FIG. 8.

Subsequently, eliminated transmitted signal $s^{sub}$ is reconstructed based on the eliminated received signal obtained from Expression (33). A constructed value of eliminated transmitted signal $s^{sub}$ can be obtained from Expressions (30a), (31) and (32). It is to be noted that eliminated transmitted signal $s^{sub}$ is reconstructed by an eliminated transmitted signal reconstructing unit 29b-2 of receiver 20 (see FIG. 8).

Figure 11:
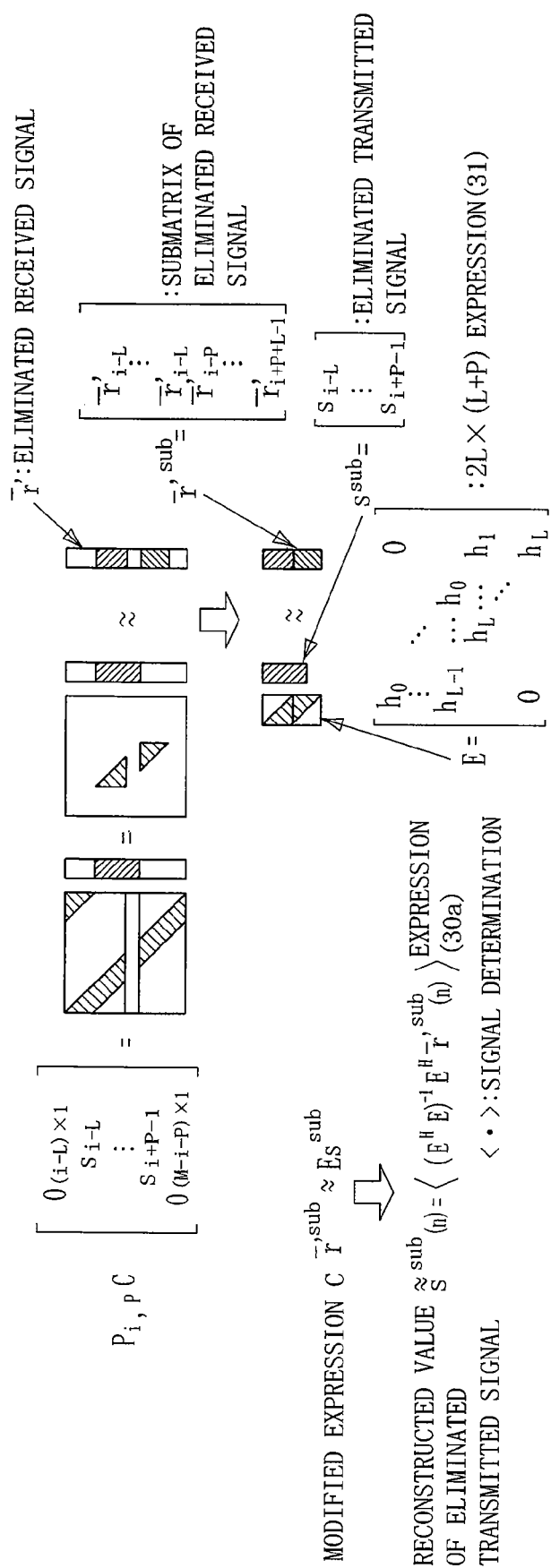
FIG. 11 shows that Modified Expression B and Modified Expression C are derived from Relational Expression A.

Expression (30a) is based on Modified Expression C in FIG. 11, which is obtained by simplifying Modified Expression B shown in FIG. 11. FIG. 11 shows a fact that Modified Expression B can be changed to Modified Expression C for simplification. In Modified Expression C, a matrix size becomes small, leading to realization of high-speed calculation.

It is to be noted that FIG. 11 also shows E (Expression (31)) obtained by simplification of $P_{i,P}C$.

Since signals, which are required as an eliminated received signal submatrix in Expression (30), of the eliminated received signals obtained from Expression (33) are different from one another in terms of position i of the local noise, Expression (32) defines the eliminated received signal submatrix in accordance with position i.

In Expression (30b), processing of rearranging the eliminated transmitted signal reconstructed value is performed such that the eliminated transmitted signal reconstructed value obtained from Expression (30a) can be applied to Expression (29). This rearrangement processing is performed by an eliminated transmitted signal rearranging unit 29b-3 of receiver 20 (see FIG. 8).

As described above, receiver 20 generates the eliminated signal replica from the rearranged eliminated transmitted signal reconstructed value and matrix $C_{ISI}$ (see Expression (29) and FIG. 8).

As shown in FIG. 7, the generated eliminated signal replica is added to the local noise eliminated received signal block, so that eliminated signal added received signal block r"(n) is generated. An equalizer 23 that performs equalization processing on eliminated signal added received signal block r"(n) performs equalization through use of a weight represented by Expression (34).

$$\gamma_m = \frac{\lambda_m^*}{|\lambda_m|^2 + \left(1 - \frac{P}{M}\right)\frac{\sigma_n^2}{\sigma_s^2}}, m = 0, \ldots, M-1 \qquad (34)$$

$\sigma_s^2$: variance of transmitted signal
$\sigma_n^2$: variance of thermal noise of receiver
$\lambda_m^*$: complex conjugate of $\lambda m$ The weight in Expression (34) is a coefficient suitable for received signal block r"(n) to which the eliminated signal is added, and allows favorable equalization processing. It is to be noted that the weight in Expression (34) can be used for equalizer 23 that performs equalization on eliminated signal added received signal block r"(n) in the second embodiment.

[Fourth Embodiment]

Figure 12:
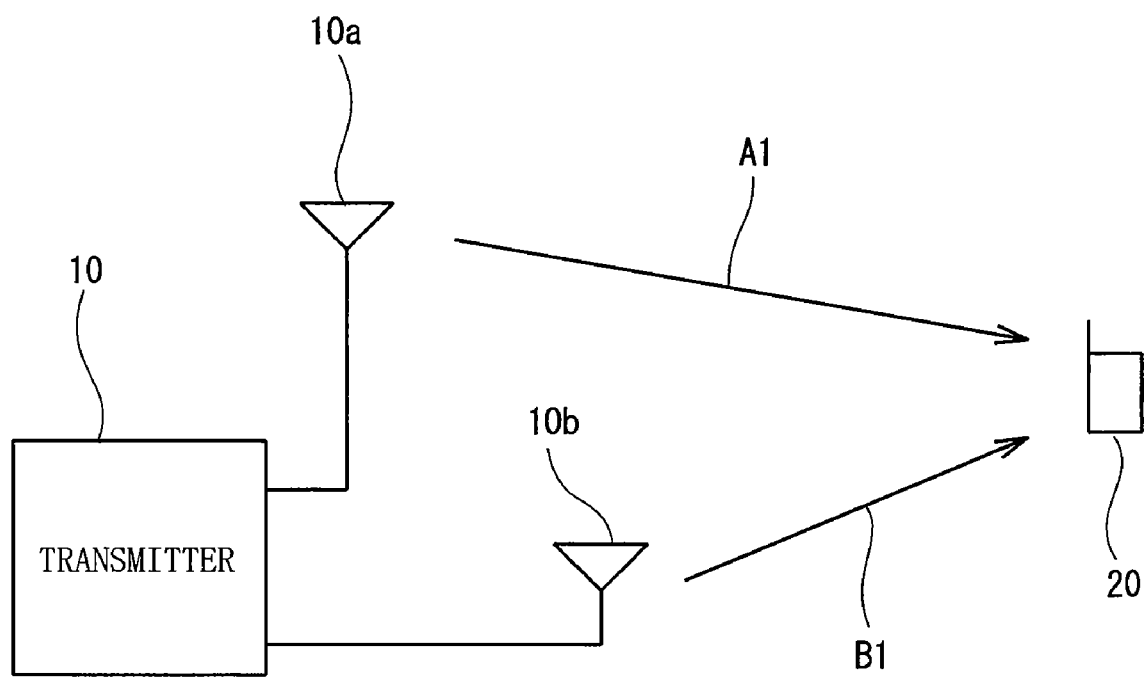
FIG. 12 shows a configuration of a transmission system according to the fourth embodiment.

FIG. 12 shows a transmission system according to the fourth embodiment. In this transmission system, a transmitter 10 transmits transmitted signals through multiple antennas 10a and 10b, so that an order to be determined by an order determining unit 22 of a receiver 20 becomes large. It is to be noted that points which are not particularly described in the fourth embodiment are similar to those in the transmission system shown in FIG. 1 as well as those in the transmission systems according to the first to third embodiments.

According to the configuration shown in FIG. 12, a channel A1 from first antenna 10a to receiver 20 is different from a channel B1 from second antenna 10b to receiver 20. Accordingly, even when transmitted signals which are equal to each other are transmitted from transmitted 10, a propagation delay D occurs between the first received signal transmitted through first antenna 10a and received by receiver 20 and the second received signal transmitted through second antenna 10b and received by receiver 20.

That is, antennas 10a and 10b form a transmitted signal delay generating unit.

Propagation delay D caused by antennas 10a and 10b is an artificial propagation delay caused by provision of multiple antennas, in addition to an inherent propagation delay L occurring at a channel 30. That is, a propagation delay (an order) L1 detected by order determining unit 22 of receiver 20 is (D+L).

Figure 13:
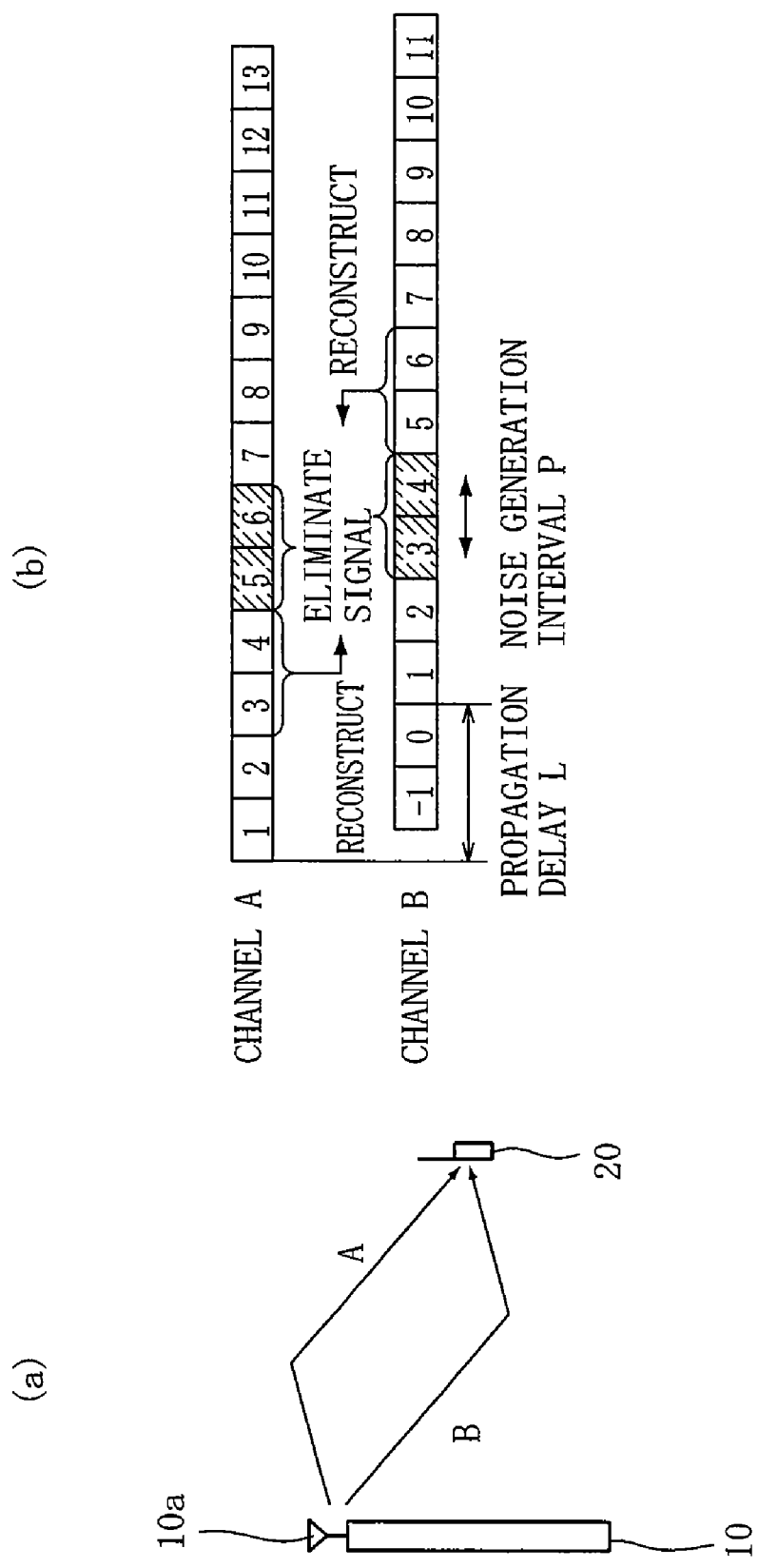
FIG. 13 shows a principle that a signal is reconstructed even when being subjected to local noise elimination processing.

Even when a signal is eliminated together with a local noise in local noise elimination processing performed by receiver 20 according to each of the first to third embodiments, such a signal can be reconstructed by a sequence of processing performed by receiver 20. Herein, description will be given of reasons therefor. As shown in FIG. 13(a), first, even when transmitter 10 has only one antenna 10a, receiver 20 receives signals passing through channels A and B which are different in propagation delay from each other, by action of reflection of the signals in the channels, and the like.

As shown in FIG. 13(b), there is a temporal difference due to propagation delay L between the two signals. Therefore, in a case where the local noise exists, the fifth symbol and the sixth symbol are eliminated in the signal passing through channel A while the third symbol and the fourth symbol are eliminated in the signal passing through the channel B.

In receiver 20 according to the present invention, the third and fourth symbols are reconstructed by signals passing through channel A while the fifth and sixth symbols are reconstructed by signals passing through channel B.

Accordingly, propagation delay L occurring at the channel is desirably larger than a temporal width P of the local noise (P≦L).

As shown in FIG. 12, when multiple antennas 10a and 10b are provided at different positions so as to transmit transmitted signals plural times, propagation delay D caused by provision of the antennas at the different positions is added to inherent propagation delay L occurring at the channel. Accordingly, a delay amount (an order of a transfer function) in receiver 20 has a value of D+L. Accordingly, even when a relation of P>L is established, a relation of P≦D+L can be established by appropriately adjusting the delay amount based on the positions of antennas 10a and 10b, leading to suitable reconstruction of the signals.

In order to avoid the influence of inter-block interference, preferably, the value of D+L is smaller than a CP length K. That is, it is preferable that the positions of antennas 10a and 10b are set so as to establish a relation of P≦D+L<K.

[Fifth Embodiment]

Figure 14:
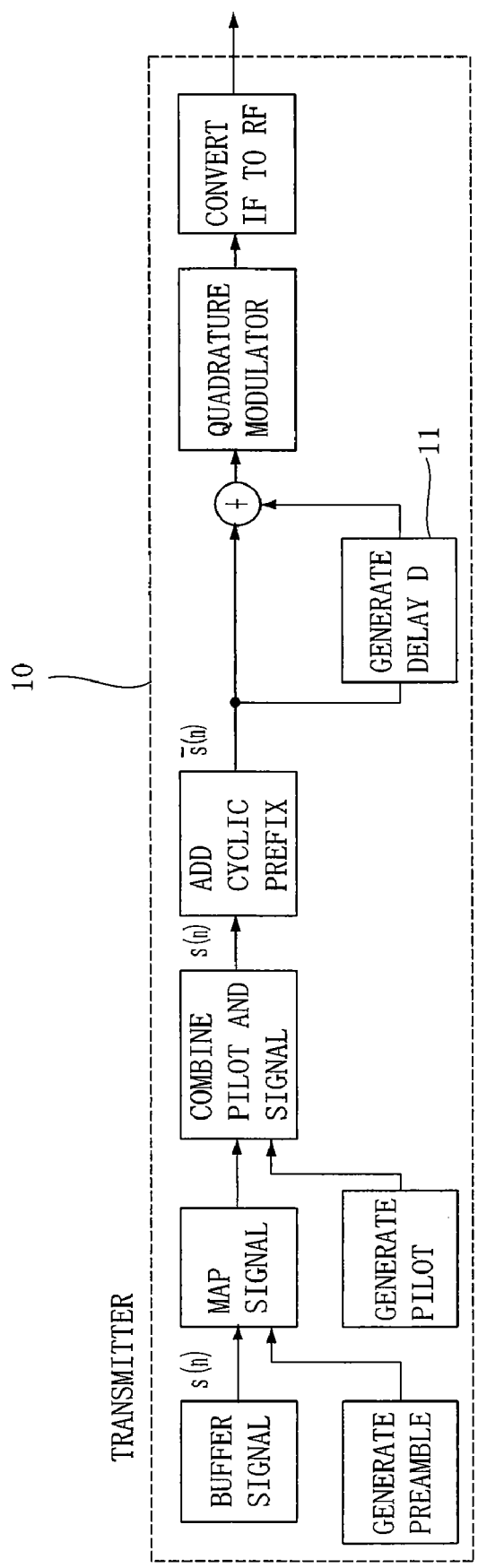
FIG. 14 shows a transmitter of a transmission system according to the fifth embodiment.
Figure 15:
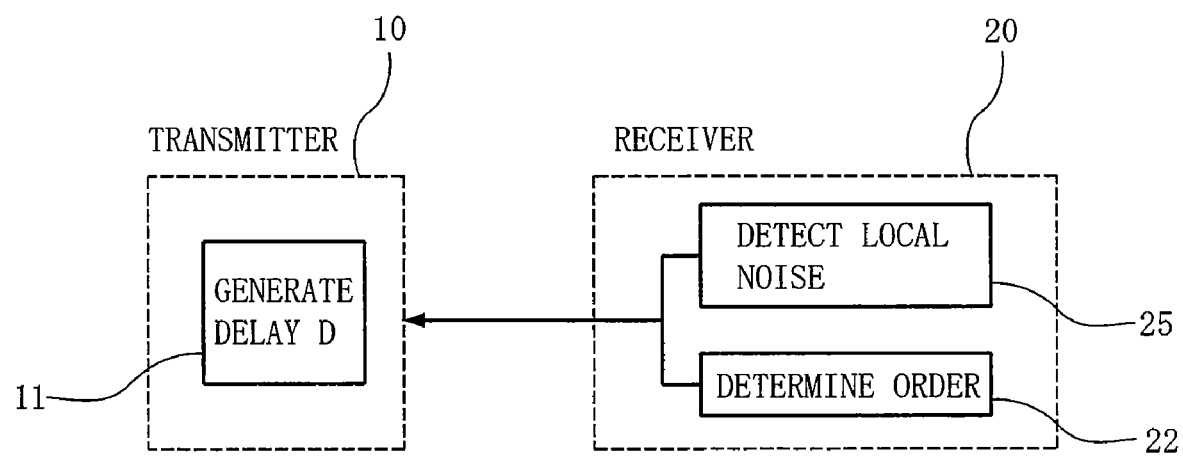
FIG. 15 shows a configuration of the transmission system according to the fifth embodiment.

FIGS. 14 and 15 show a transmission system according to the fifth embodiment. It is to be noted that points which are not particularly described in the fifth embodiment are similar to those in the transmission system shown in FIG. 1 as well as those in the transmission systems according to the first to fourth embodiments.

A transmitter 10 shown in FIG. 14 includes a delay generating unit 11 generating a delayed transmitted signal block to be combined with a transmitted signal block. Transmitter 10 combines the delayed transmitted signal block with the transmitted signal block, and then transmits the resultant to a receiver.

As a result, a propagation delay D caused by delay generating unit 11 is added to an inherent propagation delay L occurring at a channel. Accordingly, a delay amount (an order of a transfer function) in receiver 20 has a value of D+L. Accordingly, even when a relation of P>L is established, a relation of P≦D+L can be established by appropriately adjusting delay amount D, leading to suitable reconstruction of signals.

In order to avoid an influence of inter-block interference in the fifth embodiment, preferably, the value of D+L is smaller than a CP length K. That is, it is preferable that positions of antennas 10*a* and 10*b* are set so as to establish a relation of P≦D+L<K.

The value of delay amount D in delay generating unit 11 may be fixed or may be variable. When the delay amount is changed appropriately in accordance with a situation of channel 30, the relation of P≦D+L is satisfied with certainty, so that signals can be reconstructed.

FIG. 15 shows a configuration for acquiring from receiver 20 information for determining delay D generated by delay generating unit 11. In order to set appropriate delay D, preferably, a channel order L, a local noise width P and a CP length (a guard interval length) K if necessary are required. In particular, K is well known for transmitter 10 while L and P are detected by an order determining unit 22 and a local noise detecting unit 25 of receiver 20, respectively.

As shown in FIG. 15, receiver 20 transmits order L and local noise width P to transmitter 10. Delay generating unit 11 of transmitter 10 generates a delayed transmitted signal block that satisfies the relation of P≦D+L or the relation of P≦D+L<K, and then combines the generated delayed transmitted signal block with a transmitted signal block.

It is to be noted that information to be transmitted from receiver 20 to transmitter 10 may be one of order L and local noise width P with regard to delay D. For example, in a case where a transmission system is used in an environment where a channel order does not vary so much or an environment where a maximum value of the order is determined in advance, order L may be preset in transmitter 10. Moreover, in the case where the transmission system is used in an environment where a maximum value of local noise width P is determined in advance, local noise width P may be preset in transmitter 10.

In addition, order L and local noise width P are not necessarily transmitted to transmitter 10 as they are. For example, information that indirectly indicates order L and local noise width P, such as a value of P−L (delay D required at minimum), may be transmitted to transmitter 10.

EXAMPLES

Figure 16:
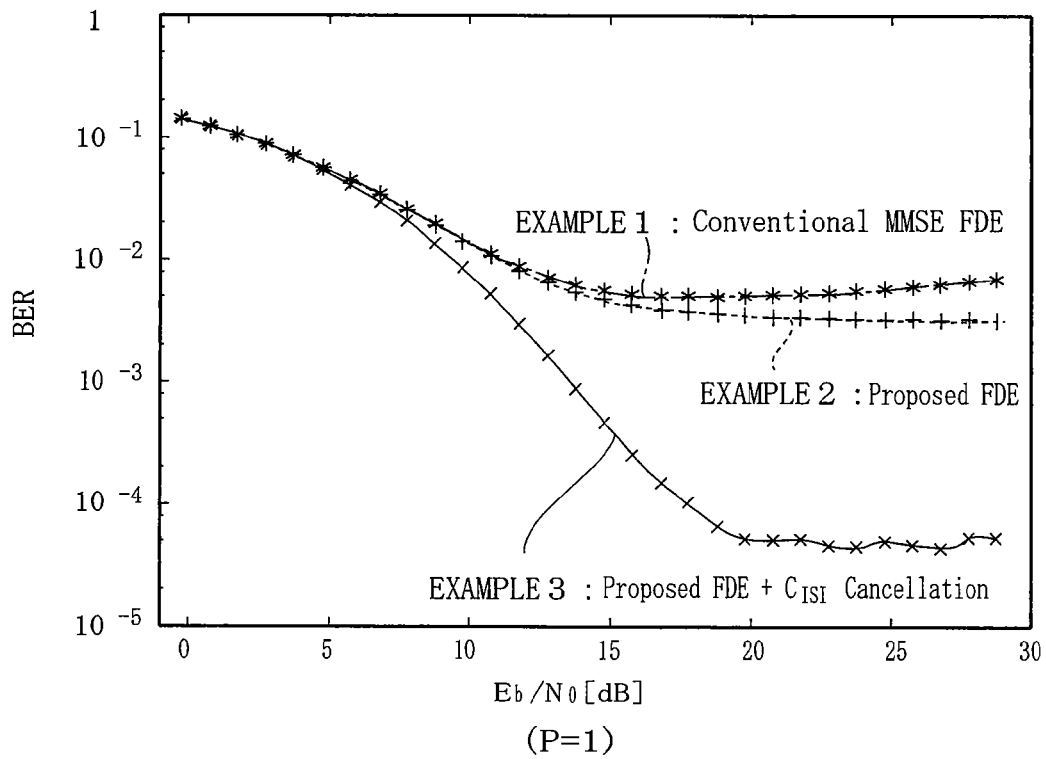
FIG. 16 shows a graph of a BER characteristic (P=1) in an example.
Figure 17:
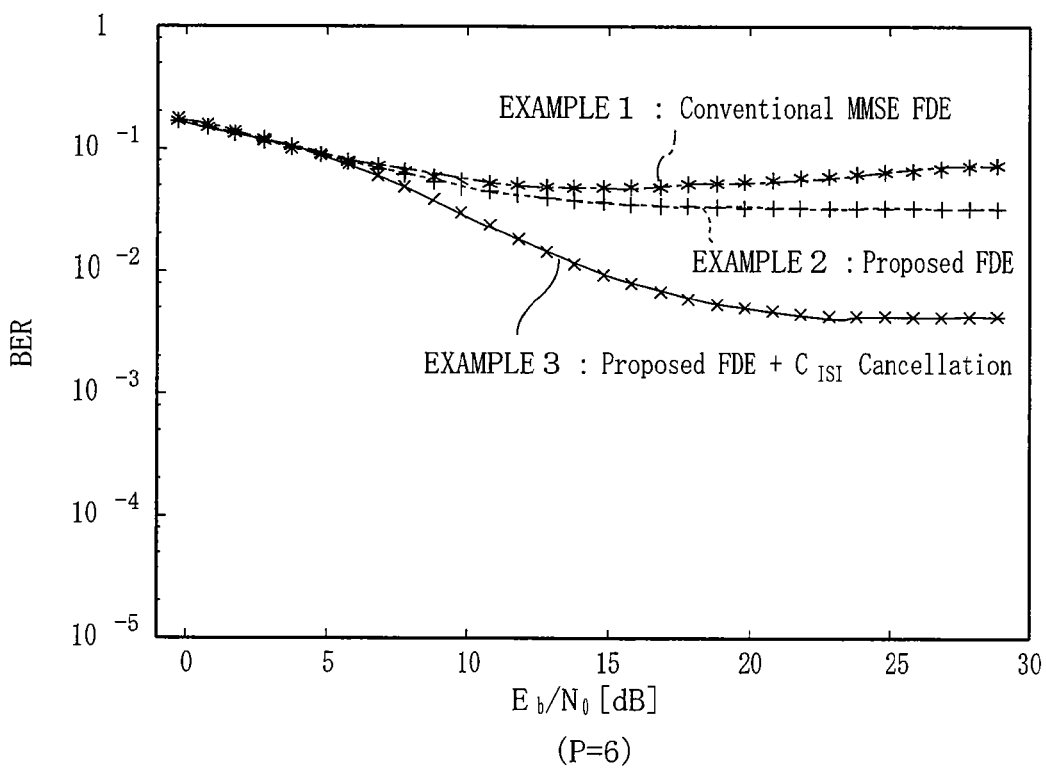
FIG. 17 shows a graph of a BER characteristic (P=6) in an example.
Figure 18:
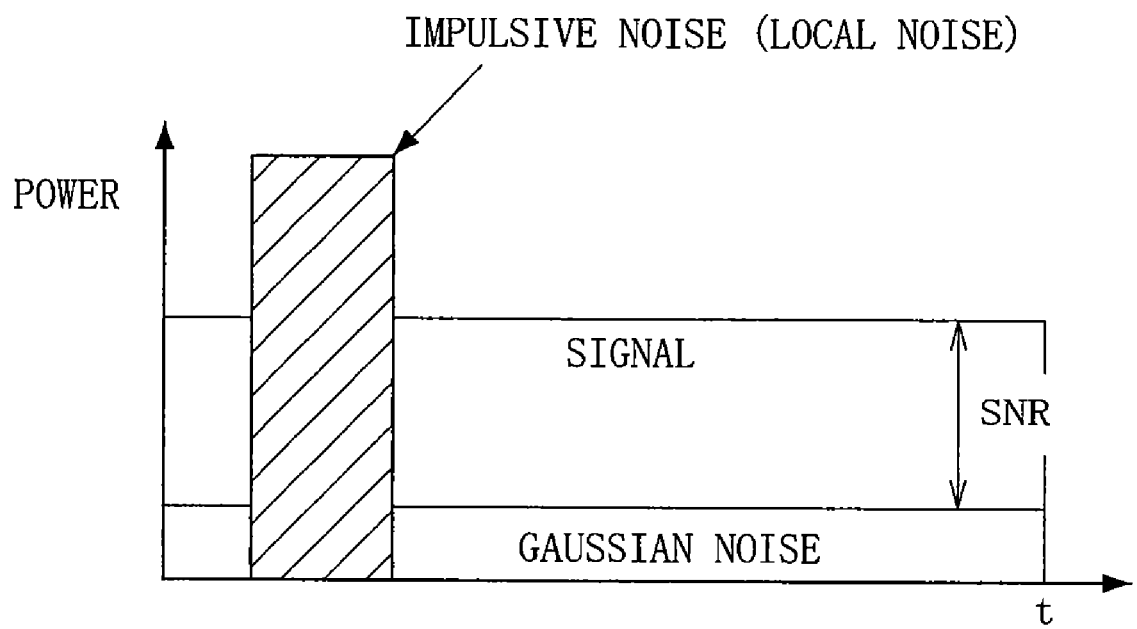
FIG. 18 shows a local noise.

Simulation results of examples according to the present invention are described as follows. FIGS. 16 and 17 show BER (Bit Error Rate) characteristics in a 10-path frequency-selective Rayleigh fading channel, as the simulation results. In FIGS. 16 and 17, an ordinate indicates a BER and an abscissa indicates a power/white noise electric power density per bit ($E_b/N_0$). Moreover, FIG. 16 shows a case where a local noise width P is 1 while FIG. 17 shows a case where local noise width P is 6.

System parameters are listed as follows.
Modulation/demodulation: QPSK
Block length M=64
CP length K=16
Order L of channel=16
Channel model: 10-path frequency-selective Rayleigh fading channel Example 1

In the transmission system (the first embodiment) shown in FIG. 3, equalizer 23 having the weight represented by Expression (19) was used.

Example 2

In the transmission system (the first embodiment) shown in FIG. 3, equalizer 23 having the weight represented by Expression (24) was used.

Example 3

A transmission system to be used herein was similar to the transmission system (the third embodiment) shown in FIGS. 7 and 8.

In a case where a local noise such as a city noise exists in a receiver having no local noise eliminating function according to the present invention, such a receiver suffers from an influence to a degree that communications become impossible. However, the transmission system in each of Examples 1 to 3 has a bit error rate to some degrees, but exhibits good performance.

Moreover, Example 2 is superior to Example 1 adopting a conventional weight in terms of BER performance. Further, Example 3 performing equalization on an eliminated signal added received signal block exhibits better BER performance.

The present invention is not limited to the foregoing embodiments, and may be modified variously within an intention of the present invention. For example, the present invention may be applied to not only wireless communication, but also other communications such as ultrasonic communication.

The invention claimed is:

1. A receiver for a block transmission scheme, in which signal blocks transmitted from a transmitting end are received and equalization processing is performed on each received signal block in, comprising:
a local noise detecting unit detecting a local noise which locally exists in a received signal block and is larger in amplitude than a signal;
a local noise eliminating unit generating a local noise eliminated received signal block from which a signal in a range where the local noise exists in the received signal block is eliminated together with the local noise; and
an equalizer that performs equalization processing based on the local noise eliminated received signal block.

2. The receiver according to claim 1, wherein
said local noise detecting unit detects, as the local noise, a range where a signal amplitude of the received signal block exceeds a predetermined threshold value.

3. The receiver according to claim 1, wherein
said local noise detecting unit detects at least a position and a noise width of the local noise in the received signal block.

4. The receiver according to claim 1, wherein
when the local noise eliminated received signal block is defined as r', said equalizer performs the equalization processing based on the following expression:

$$\hat{s}=D^H \Gamma D r',$$

where D represents a discrete Fourier transform matrix and is given by the following expression:

$$D = \begin{bmatrix} 1 & 1 & \cdots & 1 \\ 1 & e^{-j\frac{2\pi \times 1 \times 1}{M}} & \cdots & e^{-j\frac{2\pi \times 1 \times (M-1)}{M}} \\ \vdots & \vdots & \ddots & \vdots \\ 1 & e^{-j\frac{2\pi \times (M-1) \times 1}{M}} & \cdots & e^{-j\frac{2\pi \times (M-1) \times (M-1)}{M}} \end{bmatrix}$$

$D^H D = I_M$ ($I_M$: identity matrix of $M \times M$), and $M$: block length, $\Gamma$ represents a diagonal matrix having $\{\gamma_0, \ldots, \gamma_{M-1}\}$ as a diagonal component and is given by the following expression:

$$\gamma_m = \frac{\left(1 - \frac{P}{M}\right)\lambda_m^*}{\left(1 - \frac{P}{M}\right)^2 |\lambda_m|^2 + \frac{1}{M^2} \sum_{n=0, n \neq m}^{M-1} |\lambda_n|^2 \frac{1 - \cos\frac{2\pi}{M}(m-n)P}{1 - \cos\frac{2\pi}{M}(m-n)} + \left(1 - \frac{P}{M}\right)\frac{\sigma_s^2}{\sigma_n^2}}, m = 0, \cdots, M-1,$$

$\sigma_s^2$: variance of signal component of r',
P: local noise width,
$\lambda_m^*$: complex conjugate of $\lambda_m$, and
$\Lambda = \{\lambda_0, \ldots, \lambda_{M-1}\}$: discrete Fourier transform of channel impulse response $h = \{h_0, h_1, \ldots, h_L\}$.

5. The receiver according to claim 1, further comprising an eliminated signal replica generating unit generating, based on said local noise eliminated received signal block, an eliminated signal replica indicating a signal component eliminated together with the local noise upon generation of said local noise eliminated received signal block, wherein
said equalizer performs the equalization processing on an eliminated signal added received signal block corresponding to said local noise eliminated received signal block to which said eliminated signal replica is added.

6. The receiver according to claim 5, further comprising a transmitted signal block temporarily estimating unit temporarily estimating a transmitted signal block transmitted from a transmitting end, based on said local noise eliminated received signal block, wherein
said eliminated signal replica generating unit generates said eliminated signal replica based on the temporarily estimated transmitted signal block.

7. The receiver according to claim 5, wherein
said eliminated signal replica generating unit generates said eliminated signal replica based on an eliminated transmitted signal defined by the following expression:

Eliminated transmitted signal $$s^{sub} = \begin{cases} [s_{i-L}, \cdots, s_{i+P-1}]^T, L \leq i \leq M - P \\ [s_{M-L+i}, \cdots, s_{M-1}, s_0, \cdots, s_{i+P-1}]^T, 0 \leq i \leq L - 1 \end{cases}$$

where
transmitted signal block: $s(n) = [s_0, \ldots, s_{M-1}]^T$,
i: start position of local noise,
P: local noise width,
M: block length, and
L: order of channel.

8. The receiver according to claim 7, wherein
said eliminated signal replica generating unit calculates an eliminated received signal obtained by removing a component other than the eliminated transmitted signal in the temporarily estimated transmitted signal block, from said local noise eliminated received signal block, reconstructs said eliminated transmitted signal based on said eliminated received signal, and generates the eliminated signal replica based on the reconstructed eliminated transmitted signal.

9. The receiver according to claim 5, wherein
when the eliminated signal added received signal block is defined as r'', said equalizer performs the equalization processing based on the following expression:

$$\hat{s} = D^H \Gamma D r'', \text{ and}$$

$$\gamma_m = \frac{\lambda_m^*}{|\lambda_m|^2 + \left(1 - \frac{P}{M}\right)\frac{\sigma_n^2}{\sigma_s^2}}, m = 0, \cdots, M - 1$$

$\sigma_s^2$: variance of transmitted signal amplitude,
$\sigma_n^2$: variance of thermal noise amplitude of receiver,
P: local noise width,
$\lambda_m^*$: complex conjugate of $\lambda_m$, and
$\Lambda = \{\lambda_0, \ldots, \lambda_{M-1}\}$: discrete Fourier transform of channel impulse response $h = \{h_{0, 1}, \ldots, h_L\}$.

10. The receiver according to claim 1, which is configured so as to transmit to a transmitter information about a noise width of the local noise and/or an order of a transfer function of a signal channel.

11. A transmitter capable of receiving from a receiver information about a noise width of a local noise contained in a received signal block and/or an order of a transfer function of a signal channel, comprising
a delay generating unit generating a delayed signal for a signal block to be transmitted such that an order of a transfer function of a signal channel detected by said receiver becomes larger than an order of a transfer function of an actual channel, wherein
said delay generating unit generates a delayed signal indicating a delay amount corresponding to information about a local noise width and/or a transfer function order transmitted from said receiver.

12. The transmitter according to claim 11, wherein
said delay generating unit is configured to combine a delayed transmitted signal block having a delay with the transmitted signal block and transmits the combined signal block such that the order of the transfer function of the signal channel recognized by said receiver becomes large.

13. The transmitter according to claim 11, wherein
when the delay generated by said delay generating unit is defined as D, the order of the transfer function of the actual channel is defined as L and a noise width of a local noise is defined as P, the delay D generated by said delay generating unit satisfies a relation of $P \leq D + L$.

14. A block transmission system in which a receiving end receives signal blocks transmitted from a transmitting end to perform equalization processing on each received signal block, comprising:

a local noise detecting unit detecting a local noise which locally exists in a received signal block and is larger in amplitude than a signal;

a local noise eliminating unit generating a local noise eliminated received signal block from which a signal in a range where the local noise exists in the received signal block is eliminated together with the local noise; and an equalizer that performs equalization processing based on the local noise eliminated received signal block.

15. A block transmission method for receiving a signal block transmitted from a transmitting end and performing equalization processing on each received signal block by a receiving end, comprising the steps of:

detecting a local noise which locally exists in a received signal block and is larger in amplitude than a signal;

generating a local noise eliminated received signal block from which a signal in a range where the local noise exists in the received signal block is eliminated together with the local noise; and performing equalization processing based on the local noise eliminated received signal block.

* * * * *